United States Patent
Kobayashi et al.

(10) Patent No.: US 7,260,294 B2
(45) Date of Patent: Aug. 21, 2007

(54) WAVELENGTH TUNING DEVICE AND WAVELENGTH TUNING METHOD

(75) Inventors: Shuko Kobayashi, Kanagawa (JP); Kensuke Sasaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/543,211

(22) Filed: Oct. 5, 2006

(65) Prior Publication Data

US 2007/0092182 A1    Apr. 26, 2007

(30) Foreign Application Priority Data

Oct. 12, 2005  (JP) ............. 2005-297822

(51) Int. Cl.
*G02B 6/34* (2006.01)
(52) U.S. Cl. .............. 385/37; 385/15; 385/31
(58) Field of Classification Search ............ 385/37
See application file for complete search history.

(56) References Cited

U.S. PATENT DOCUMENTS 6,384,404 B1 *  5/2002  Berg .................. 250/227.16
7,127,140 B2 * 10/2006  Kobayashi et al. ........ 385/37

FOREIGN PATENT DOCUMENTS

| JP | 2000-503415 | 3/2000 |
|----|-------------|--------|
| WO | WO-97/26572 | 7/1997 |

* cited by examiner

*Primary Examiner*—Jennifer Doan
(74) *Attorney, Agent, or Firm*—Rabin & Berdo, PC

(57) ABSTRACT

A wavelength tuning device of the invention tunes the reflected wavelength of a fiber Bragg grating, and includes: an optical fiber (102) in which a fiber Bragg grating (106) is formed; a base member (104) to which the optical fiber (102 is fixed; a first temperature sensor (112) that detects a temperature of the base member (104); a thermo-module (116) that adjust the temperature of the base member (104) such that the temperature detected by the first temperature sensor (112) is maintained at a desired temperature; a second temperature sensor (126) that detects an external temperature of the wavelength tuning device; and a temperature controller (130) that controls the thermo-module (116) such that the temperature of the base member (104) is maintained at the desired temperature based on the external temperature detected by the second temperature sensor (126).

20 Claims, 16 Drawing Sheets

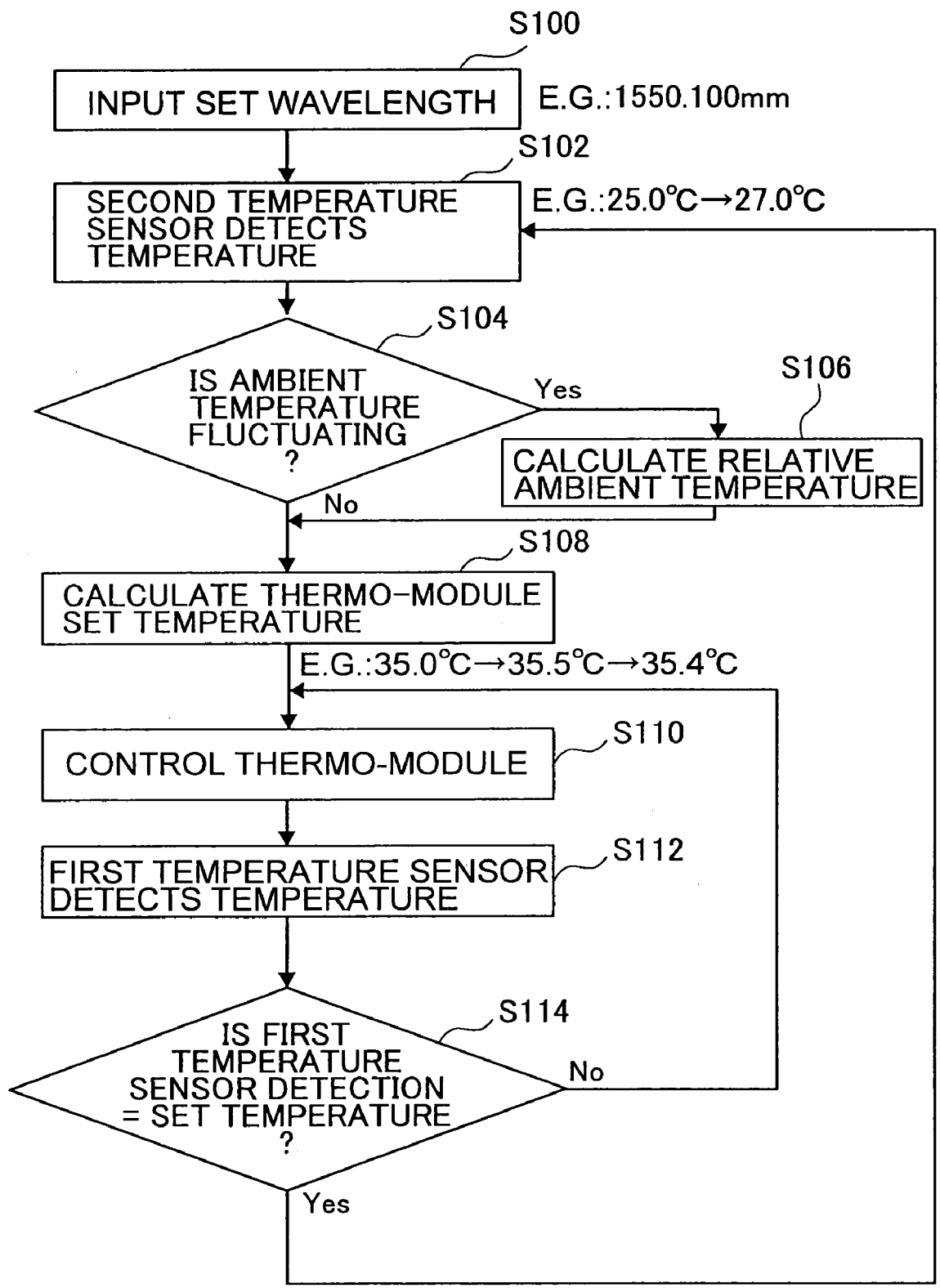
*FIG.*9

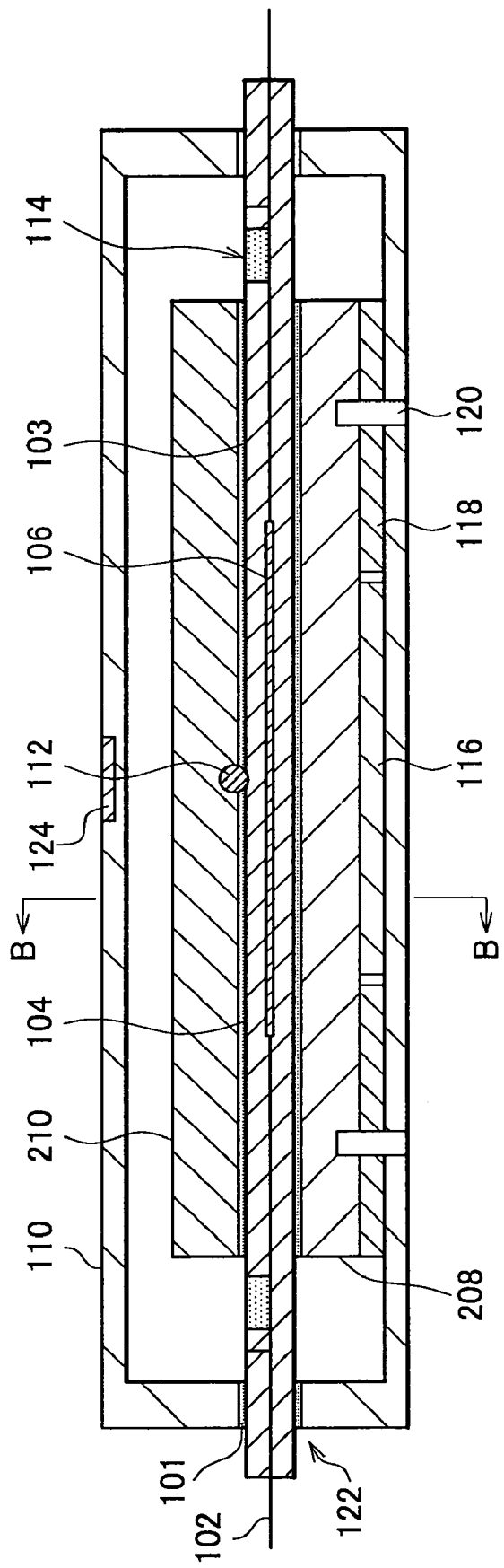

WAVELENGTH TUNING DEVICE AND WAVELENGTH TUNING METHOD

CROSS REFERENCE TO RELATED APPLICATIONS

The disclosure of Japanese Patent Application No. JP 2005-297822 filed on Oct. 12, 2005 including the specification, drawings and abstract is incorporated herein by reference in its entirety.

BACKGROUND OF THE INVENTION

1. Field of the Invention

The invention relates to a wavelength tuning device and a wavelength tuning method for tuning a reflected wavelength of a fiber Bragg grating. More particularly, the invention relates to a wavelength tuning device and a wavelength tuning method for automatically controlling variation of the reflected wavelength caused by temperature fluctuation.

2. Description of the Related Art

In recent years, there has been a rapid increase in demand for communication as a result of the increasing popularity of the internet etc., and high speed, large capacity networks using optical fiber are being installed. In high speed, large capacity optical networks of this type, Wavelength Division Multiplexing (hereinafter simply referred to as "WDM") transmission techniques are indispensable. In particular, great attention is being focused on Dense WDM (hereinafter simply referred to as "DWDM") techniques in which the wavelength interval is narrowed, and the optical carrier wave is densely arranged on the wavelength axis.

In addition, Optical Code Division Multiplexing (hereinafter simply referred to as "OCDM") transmission techniques are also gaining attention, and are expected to increase wavelength utilization through combined use with WDM or DWDM, and offer superior transmission security and demultiplexing. OCDM techniques perform demultiplexing by modulating using a different code for each channel on the transmission side, and decoding at the receiving side using the same code as the transmission side. Various techniques are known including techniques that combine time-spread/wavelength-hopping techniques (hereinafter simply referred to as "wavelength-hopping techniques") in which the assigned sequence on multiple wavelengths and the time domain of each wavelength is encoded, and phase coding techniques in which dispersed optical pulse trains are encoded.

Technology is known in which a fiber Bragg grating (hereinafter referred to simply as "FBG") is used as the optical filter device in WDM or DWDM systems, or the encoder/decoder in OCDM systems. The FBG is a device that includes a refractive index modulating region with a lattice shape, namely, a grating, formed in the core of an optical fiber. The FBG reflects a specific wavelength. However, it is known that the reflected wavelength of the FBG varies substantially in accordance with the external temperature (hereinafter also referred to as the "ambient temperature") surrounding the FBG as a result of temperature dependence of the refractive index of the FBG and expansion/contraction of the optical fiber caused by temperature, etc.

Methods for inhibiting variations of the reflected wavelength of an FBG caused by ambient temperature have been proposed such as that disclosed in Published Japanese Translation of PCT Application, JP-T-2000-503415. According to the method disclosed in JP-T-2000-503415, an optical fiber in which an FBG is formed is fixed on a ceramic board that has a negative coefficient of thermal expansion. Variations in the reflected wavelength of the FBG caused by fluctuations in the ambient temperature are corrected based on a change amount of the reflected wavelength of the FBG caused by expansion/contraction of the optical fiber, in accordance with expansion/contraction of the ceramic board.

However, particularly in the case when the FBG is used as the OCDM encoder/decoder described above, if there is any deviation in the reflected wavelengths of the FBGs between each paired encoder and decoder, transmission quality deteriorates. Accordingly, the reflected wavelengths must be made substantially the same. However, in the above method, wavelength variation can occur that can cause a wavelength difference between the encoder and decoder that exceeds the level of wavelength difference that is necessary to maintain transmission quality. Moreover, in the above method, the reflected wavelength is determined at the stage when the optical fiber is fixed and cannot be changed. Thus, if the optical light source wavelength varies, it is not possible to adjust the reflected wavelength of the FBG, and transmission quality deteriorates.

SUMMARY OF THE INVENTION

The present invention has been devised in light of the above problems, and it is an object thereof to provide an innovative and improved wavelength tuning device and a wavelength tuning method that can inhibit undesirable variation in a reflected wavelength of an FBG with high accuracy, and that can tune the reflected wavelength of the FBG to a desired wavelength.

In order to solve the above described problems, one aspect of the invention provides a wavelength tuning device for tuning a reflected wavelength of a fiber Bragg grating. This wavelength tuning device includes: an optical fiber in which the fiber Bragg grating is formed; a base member on which the optical fiber is fixed; and a first temperature sensor that detects a temperature of the base member. In addition, the wavelength tuning device also includes: a thermo-module that adjust the temperature of the base member such that the temperature detected by the first temperature sensor is maintained at a desired temperature; a second temperature sensor that detects an external temperature of the wavelength tuning device; and a temperature controller that controls the thermo-module such that the temperature of the base member is maintained at the desired temperature based on the external temperature detected by the second temperature sensor.

According to the above invention, when the desired temperature is set, the temperature controller controls the thermo-module in accordance with the temperature difference between the set value and the temperature detected by the first temperature sensor such that the temperature detected by the first temperature sensor becomes equal to the set value. Heat of the thermo-module is conducted to the base member, whereby the base member is heated/cooled. Accordingly, control of the thermo-module by the temperature controller steadily maintains the base member, on which the optical fiber formed with the FBG is fixed, at the desired temperature. Further, the temperature controller adjusts the set temperature based on the external temperature detected by the second temperature sensor. According to the above structure, the thermo-module adjusts the temperature and repeatedly re-adjusts the temperature of the base member in accordance with the control of the temperature controller. This structure allows a desired reflected wavelength to be stably maintained by performing re-tuning as necessary for minute wavelength variations caused by fluctuations in the external temperature of the wavelength tuning device.

The second temperature sensor may be provided on a casing of the wavelength tuning device. However, it is sufficient if the position at which the second temperature sensor is provided is a position that allows the external temperature of the wavelength tuning device to be detected. Such positions include an upper section, a lower section or either side surface of the casing. Providing the second temperature sensor on the casing of the wavelength tuning device allows the external temperature of each wavelength tuning device to be detected, thereby allowing the temperature controller to perform appropriate temperature adjustment of the wavelength tuning device.

The temperature controller may include a wavelength characteristic data storage portion that stores wavelength characteristic data indicating a characteristic of the reflected wavelength of the fiber Bragg grating that is dependent upon temperature fluctuation. Further, the temperature controller may set a set temperature that causes the reflected wavelength of the fiber Bragg grating to become a desired reflected wavelength based on the wavelength characteristic data, and adjust the set temperature in accordance with fluctuation in the external temperature detected by the second temperature sensor. As a result of adopting this structure, the wavelength characteristic data of the fiber Bragg grating provided in the wavelength tuning device can be used to adjust the set temperature of the temperature controller.

In addition, the wavelength characteristic data may include wavelength tuning characteristic data and wavelength variation characteristic data. The wavelength tuning characteristic data indicates the relationship between the set temperature set by the temperature controller and the reflected wavelength of the fiber Bragg grating at predetermined external temperatures. The wavelength variation characteristic data indicates the relationship between the temperature difference of the set temperature and the external temperature, and variation of the reflected wavelength of the fiber Bragg grating. The wavelength tuning characteristic data and the wavelength variation characteristic data are favorably actual measurement data of the wavelength tuning device. However, data obtained by simulation may also be used. Adoption of the above structure allows more accurate control of the temperature since wavelength characteristic data can be obtained for the wavelength tuning device.

The wavelength variation characteristic data may be used as a basis for calculating a variation rate of the reflected wavelength based on the temperature difference between the set temperature and the external temperature. Thus, in the case that the external temperature fluctuates, the variation rate of the reflected wavelength may be calculated based on the temperature difference of the external temperature and the set temperature, and the temperature re-adjusted. With this structure, the temperature difference with the external environment can also be taken into consideration, and thus the temperature can be adjusted more accurately and the wavelength tuned with higher accuracy.

The base member may be made of material with low thermal expansivity. According to this structure, expansion/contraction of the base member that occurs along with fluctuations of the external temperature etc. can be suppressed. Accordingly, it is possible to inhibit extension/contraction of the optical fiber fixed to the base member that is caused by expansion/contraction of the base member.

The wavelength tuning device may include a support member that supports the base member. This support member may be the casing of the wavelength tuning device, a holder that supports the base member within the casing, or both of these members.

An expansion-contraction absorbent may be interposed between the support member and the base member. The expansion-contraction absorbent absorbs expansion/contraction of the support member that occurs along with temperature fluctuation. According to this structure, expansion-contraction of the support member is inhibited from being transmitted to the base member.

The holder may be made of material with high thermal conductivity. According to this structure, heating/cooling of the thermo-module is easily transmitted to the base member from the holder, thereby allowing temperature adjustment of the base member in accordance with control of the temperature controller to be performed without delay.

The base member and the holder may be engaged at one location. According to this structure, the base member is inhibited from moving in the extension direction of the optical fiber. In addition, as a result of providing engagement at one location, it is possible to inhibit the base member from being influence by expansion-contraction of the holder at an engagement section.

The one location may be a central area of the holder in the extension direction of the optical fiber. According to this structure, even if the holder expands/contracts, the engagement section is provided in the central area where positional misalignment is unlikely to occur. Thus, it is possible to inhibit expansion-contraction of the holder from having an impact on the base member at the engagement section.

The above wavelength tuning device may include a thermal conduction inhibiting member that is made of material with low thermal conductivity, and the base member may be surrounded by the holder and the thermal conduction inhibiting member. If the holder is interposed between the thermo-module and the base member as described above, it is favorable that the thermal conduction inhibiting member is positioned apart from the thermo-module so as not to inhibit transmission of heat to the base member from the thermo-module. Note that, the holder and the thermal conduction inhibiting member may be integrated. According to this structure, the thermal conduction inhibiting member inhibits radiation of ambient temperature fluctuations to the base member. Thus, it is possible to inhibit an uneven temperature distribution from being generated in the base member.

In order to address the above described problems, another aspect of the invention provides a wavelength tuning method for a wavelength tuning unit, including: an optical fiber in which a fiber Bragg grating is formed; a base member to which the optical fiber is fixed; a first temperature sensor that detects a temperature of the base member; and a thermo-module that adjust the temperature of the base member such that the temperature detected by the first temperature sensor is maintained at a desired temperature. This wavelength tuning method includes a first step of setting a temperature that causes a reflected wavelength of the fiber Bragg grating to become a desired reflected wavelength based on wavelength tuning characteristic data that indicates the relationship of the reflected wavelength of the fiber Bragg grating, and a set temperature of the thermo-module. In addition, the wavelength tuning method includes a second step of calculating a temperature difference of the set temperature set in the first step, and an external temperature of the wavelength tuning unit. Further, the wavelength tuning method includes a third step of adjusting the set temperature set in the first step using the temperature difference calculated in the second step based on wavelength variation characteristic data indicating the relationship between the temperature difference of the set temperature of the thermo-module and the external temperature of the wavelength tuning unit, and variation of the reflected wavelength of the fiber Bragg grating.

According to the above invention, the set temperature that causes the reflected wavelength to become the desired reflected wavelength is set based on the wavelength tuning characteristic data, and wavelength variations caused by difference between the external temperature and the set temperature are suppressed based on the wavelength variation characteristic data. Accordingly, a predetermined reflected wavelength can be stably maintained.

The above wavelength tuning method further includes, in the case that the external temperature of the wavelength tuning unit fluctuates, a fourth step of calculating the temperature difference of the set temperature adjusted in the third step and the external temperature of the wavelength tuning unit. Further, in this case, the wavelength tuning method includes a fifth step of adjusting the set temperature set adjusted in the third step using the temperature difference calculated in the fourth step based on the wavelength variation characteristic data. As a result of using this method, the set temperature can be re-adjusted based on the wavelength variation characteristic data, thereby allowing suppression of minute wavelength fluctuations caused by fluctuations in the external temperature.

In addition, the fourth step and the fifth step may be repeatedly performed to adjust the set temperature of the thermo-module. If this is performed, the set temperature can be automatically re-adjusted such that the reflected wavelength of the FBG becomes the desired reflected wavelength.

In addition, the wavelength tuning characteristic data and the wavelength variation characteristic data may be stored in the temperature controller that controls the thermo-module such that the temperature of the base member is maintained at the desired temperature.

According to the present invention as described above, undesirable variations in the reflected wavelength of the FBG can be inhibited, and the reflected wavelength of the FBG can be tuned to a desired reflected wavelength.

BRIEF DESCRIPTION OF THE DRAWINGS

FIG. 9 is an explanatory drawing that illustrates the operation of the wavelength tuning device of the first embodiment when wavelength tuning is being performed;

FIG. 10 is a cross sectional view of the wavelength tuning unit according to the second embodiment;

DETAILED DESCRIPTION OF THE PREFERRED EMBODIMENTS

Figure 1:
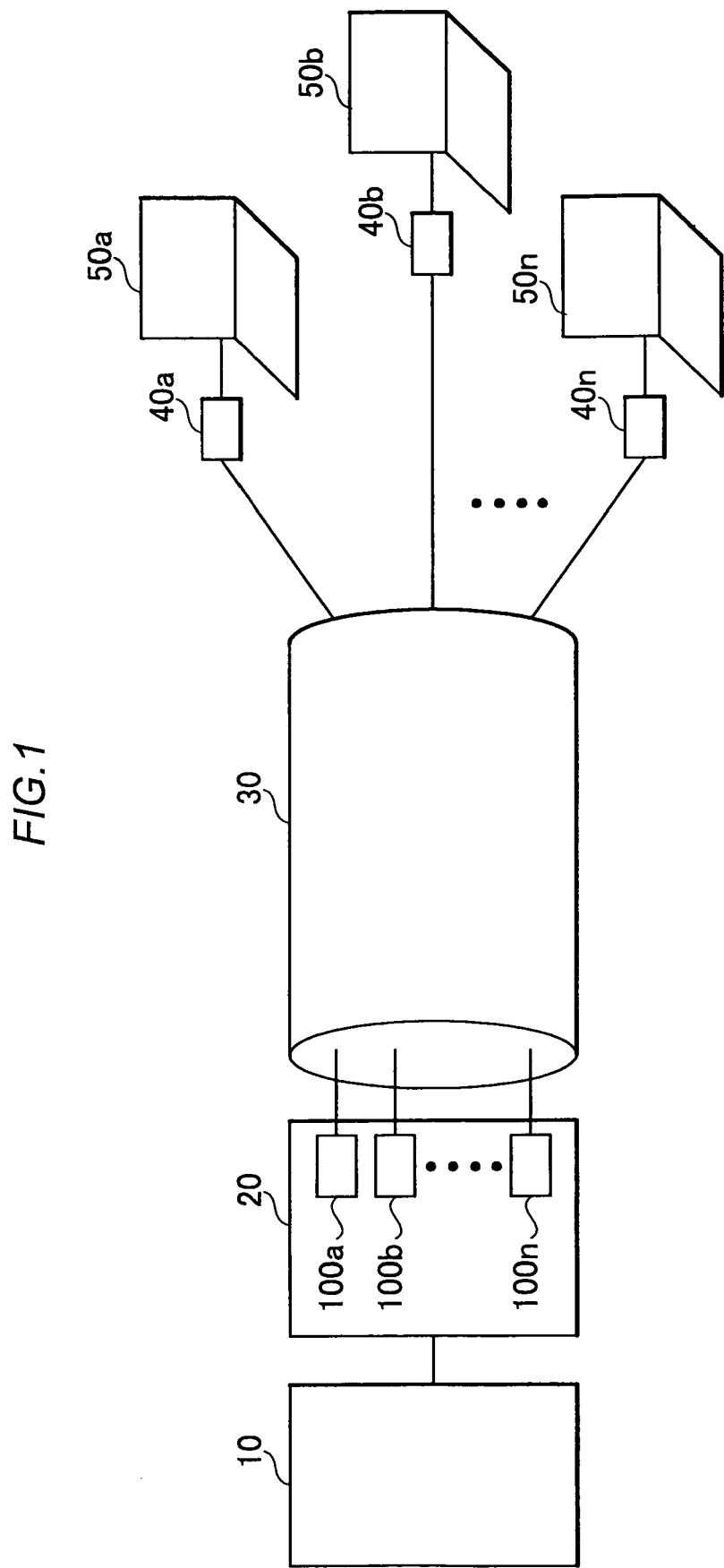
FIG. 1 is an explanatory drawing showing an outline of an optical fiber network including a wavelength tuning device according to a first and a second embodiment of the present invention.

Hereinafter, preferred embodiments of the present invention will be described in detail with reference to the drawings. Note that, in this specification and the appended drawings, structural elements that have substantially the same function and structure are denoted with the same reference numerals, and repeated explanation of these structural elements is omitted.

First Embodiment

Next, an example will be described in which the wavelength tuning device according to the present invention is applied as a wavelength tuning unit 100 that can be used as an encoder/decoder in phase coding OCDM. For the encoder/decoder used in phase coding OCDM, a Superstructured FBG (hereinafter simply referred to as "SSFBG") with a multi-phase shift structure is sometimes used. The SSFBG includes a plurality of FBG (hereinafter referred to as "unit FBGs") that have the same length and the same period for the modulation range of the refractive index (i.e., the reflected wavelengths are the same), and has a selectively set interval (including zero) between the unit FBGs that accords with the configured code. When an SSFBG is used, however, the wavelengths of the encoder and decoder must be made to match with a high degree of accuracy, since even if there is a wavelength difference of a just a few picometers (pm) between the paired encoder and the decoder, decoding cannot be carried out accurately.

The wavelength tuning unit 100 according to the present embodiment can inhibit undesirable variation in the reflected wavelength of an FBG. Accordingly, if the wavelength tuning unit 100 is applied to an encoder/decoder, it is possible to inhibit deviation of wavelength between the encoder and decoder caused by variation in the respective reflected wavelengths of the respective unit FBGs provided in the encoder and decoder.

In addition, the wavelength tuning unit 100 according to the present embodiment can tune the reflected wavelength of the FBG to a desired wavelength. Thus, if the wavelength tuning unit 100 is applied as an encoder/decoder, the wavelength of the encoder/decoder can be tuned to a desired wavelength, thereby allowing fluctuations of a light source (not shown) or the like to be managed.

First, FIG. 1 will be used to explain an outline of an optical fiber network including the wavelength tuning unit 100 according to the present embodiment. FIG. 1 is an explanatory drawing showing the outline of the optical fiber network including the wavelength tuning unit 100 according to the present embodiment. Referring to FIG. 1, the optical fiber network according to the present embodiment includes, for example, a data communication unit 10, a control unit 20, an optical fiber network 30, control devices 40, and personal computers (PC) 50. Electric signals transmitted from the data transmission unit 10 are multiplexed by the control unit 20, and converted to light signals. The light signals converted by the control unit 20 are transmitted to the control units 40 via the optical fiber network 30. The light signals transmitted to the control units 40 are converted to electric signals and transmitted to each PC 50.

The control unit 20 is provided with the wavelength tuning unit 100, which is used for one or two or more encoders. The control unit 20 controls the wavelength encoded by the wavelength tuning unit 100 based on the state of a light source wavelength and the like. More specifically, the control unit 20 controls the wavelength tuning unit 100 such that the wavelength is tuned in accordance with fluctuations in the light source and the like. In addition, each control unit 40 connected to each PC 50 is also provided with a wavelength tuning unit (not shown) that is used as a decoder and which forms a pair with the wavelength tuning unit 100 provided in the control unit 20. The wavelength tuning units provided in the control units 40 tune the decoded wavelength based on the state of the light source.

There are two causes of variation in the reflected wavelength of the FBG used in the wavelength tuning unit 100, namely, temperature and stress. Here, temperature refers to the temperature of the FBG. The reflected wavelength varies along with fluctuation in the temperature of the FBG. Accordingly, if the temperature around the FBG (the ambient temperature) fluctuates, this temperature fluctuation is conducted to the FBG, thereby causing the reflected wavelength of the FBG to vary. Further, stress refers to stress on the FBG or stress on the optical fiber in which the FBG is formed. As stress varies, the reflected wavelength of the FBG varies. Stress as used here includes both stress in the radial direction of the optical fiber, and stress in the extension direction of the optical fiber. According to the wavelength tuning unit 100 of the present embodiment, variation in the reflected wavelength of the FBG caused by the transmission of stress to the optical fiber along with expansion/contraction of a casing 110 can be inhibited. In addition, undesirable variation in the wavelength of the FBG caused by temperature fluctuation can also be inhibited. Moreover, the reflected wavelength of the FBG can be controlled to a desired wavelength by controlling the temperature of the FBG while inhibiting variation of the reflected wavelength of the FBG caused by stress variation. Next, the wavelength tuning unit 100 will be explained in more detail.

Configuration of the Wavelength Tuning Device

Figure 2:
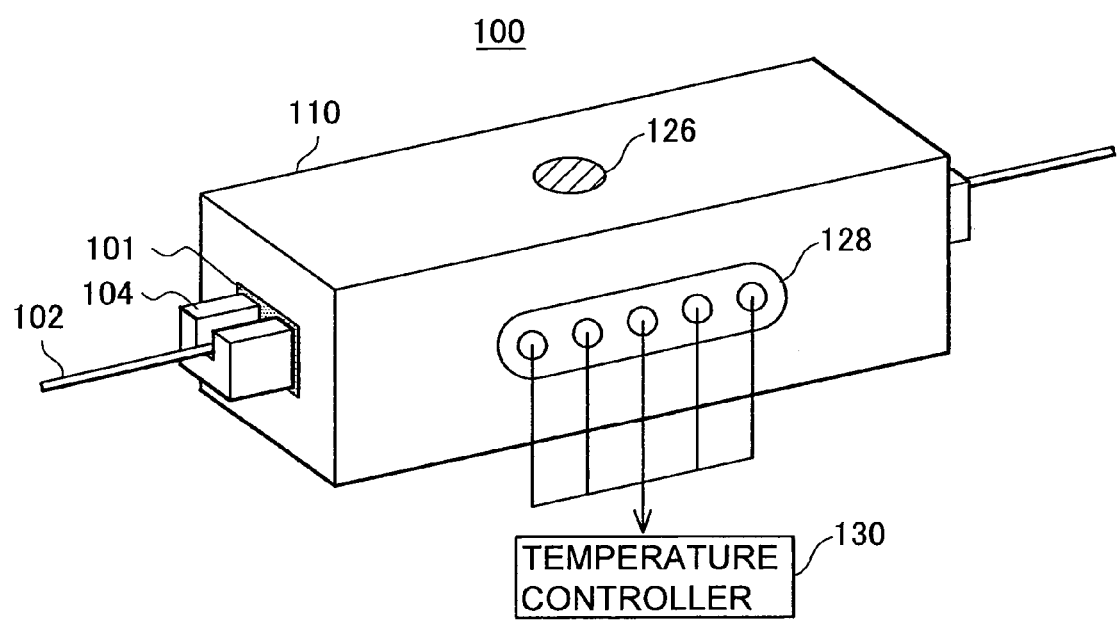
FIG. 2 is a perspective view showing the external appearance of a wavelength tuning unit according to the first and the second embodiments of the present invention.
Figure 3:
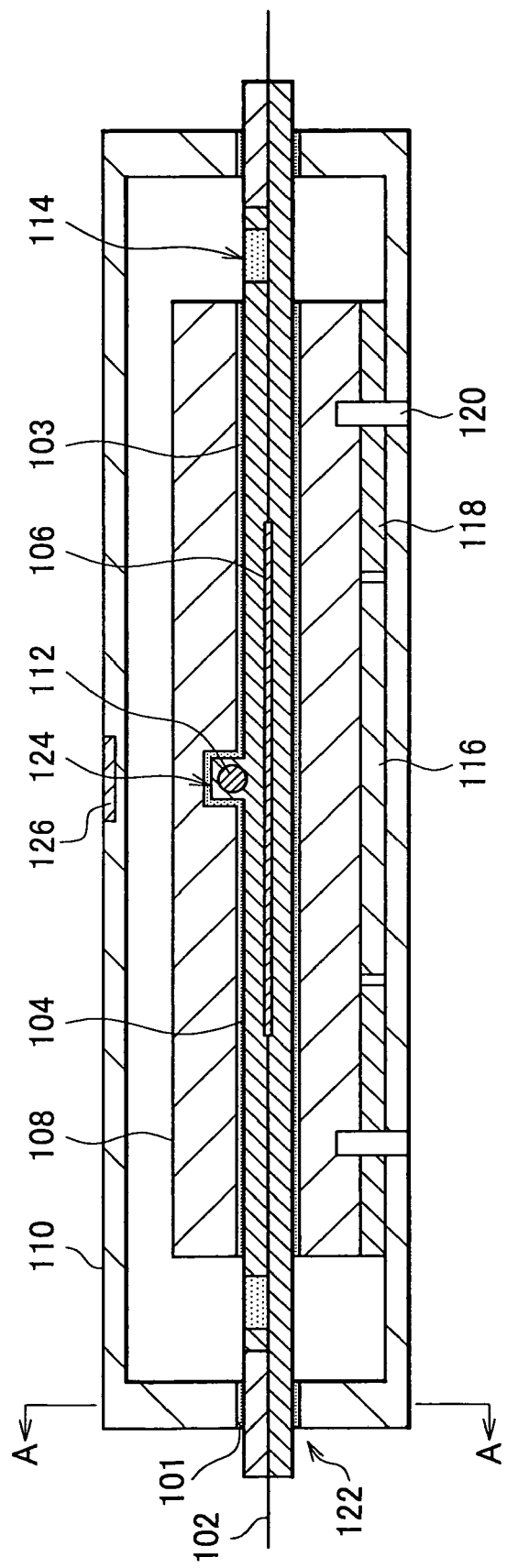
FIG. 3 is a cross sectional view of the wavelength tuning unit according to the first embodiment.
Figure 4:
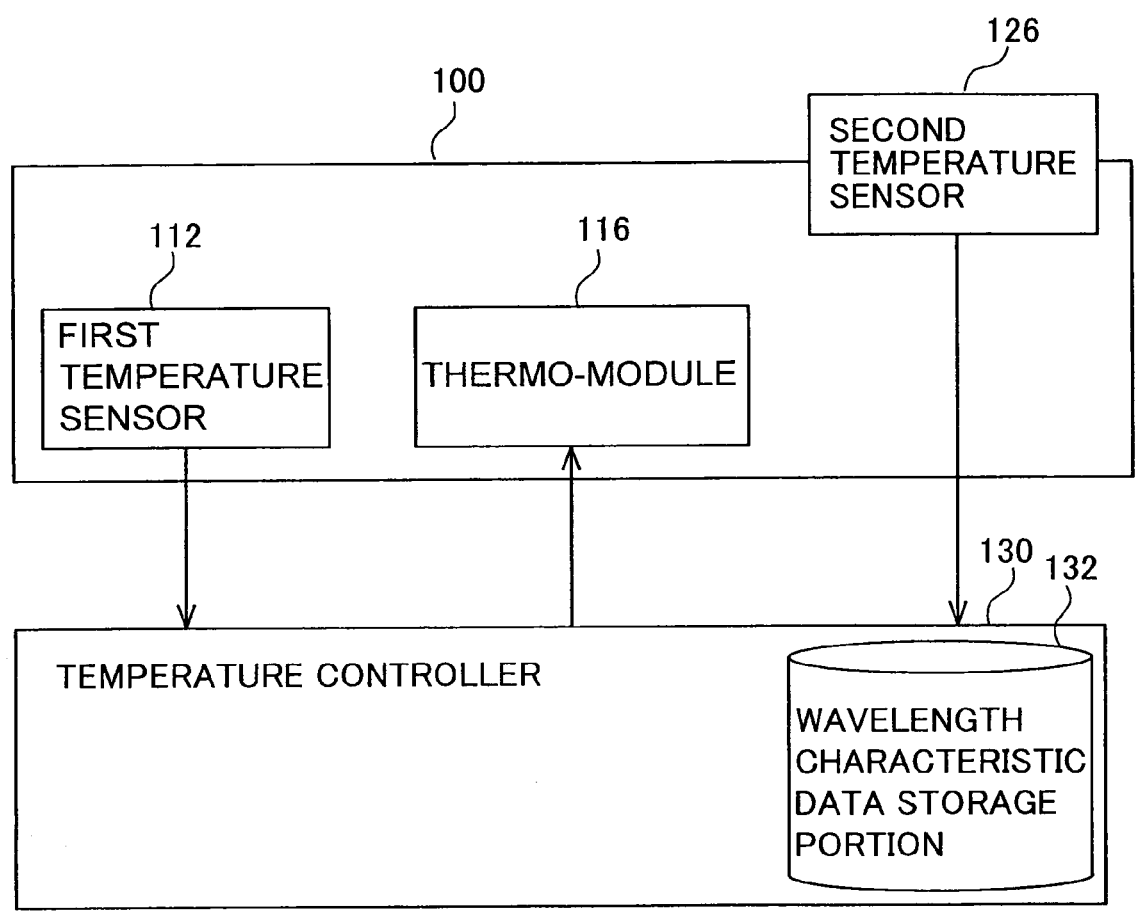
FIG. 4 is a block diagram that explains the functions of a temperature controller of the first embodiment.

FIG. 2 is a perspective view of an outline of the external appearance of the wavelength tuning unit 100. Referring to FIG. 2, the wavelength tuning unit 100 includes the casing 110, a base member 104, and an optical fiber 102. The optical fiber 102 is surrounded by the base member 104, and the base member 104 protrudes from both ends of the casing 110. A first expansion-contraction absorbent 101 that absorbs expansion/contraction of the casing 110 is interposed between the base member 104 and the casing 110. The wavelength tuning unit 100 is connected to a temperature controller 130 (shown in FIG. 4 and described hereinafter) via a connector 128. The temperature controller 130 is connected to a first temperature sensor 112, a second temperature sensor 126, and a thermo-module 116 (the first temperature sensor 112 and the thermo-module 116 are shown in FIG. 3 and described hereinafter). The first temperature sensor detects the internal temperature of the wavelength tuning unit 100. The second temperature sensor 126 detects the external temperature of the wavelength tuning unit 100. The thermo-module 116 maintains the temperature detected by the first temperature sensor at a desired temperature. The temperature controller 130, the first temperature sensor 112, and the thermo-module 116 will be explained in more detail later. The wavelength tuning device according to the present invention includes the wavelength tuning unit 100 and the temperature controller 130. In the present embodiment, the wavelength tuning unit 100 and the temperature controller 130 are separate devices, but the wavelength tuning unit 100 and the temperature controller 130 may be integrated.

Next, the configuration of the wavelength tuning unit 100 will be explained in more detail while referring to FIG. 3. FIG. 3 is a cross sectional view of the wavelength tuning unit 100. The wavelength tuning unit 100 includes, as main members, the optical fiber 102 in which an SSFBG 106 is formed, the base member 104, a holder 108, the casing 110, the first temperature sensor 112, the thermo-module 116, the second temperature sensor 126, and the temperature controller 130 (not shown).

First, the relationship of the various structural members of the wavelength tuning unit 100 will be explained. The optical fiber 102, in which the SSFBG 106 is formed, is adhered to the base member 104 at two adhered sections 114 such that stresses such as tensile force or compressive force are not applied to the optical fiber 102. Accordingly, the optical fiber 102 is fixed to the base member 104. As the adhesive agent, an acrylic adhesive that has been ultraviolet cured or an epoxy adhesive may be used. Alternatively, the optical fiber 102 may be placed in intimate contact with the base member 104 using, for example, a material with high thermal conductivity like silicon grease. The base member 104 is supported by the holder 108. It is desirable that the base member 104 and the holder 108 are arranged such that the SSFBG 106 formed in the optical fiber 102 fixed to the base member 104 is positioned in a central area of the holder 108 in the extension direction of the optical fiber 102. However, it is not essential for the SSFBG 106 to be positioned in the central area, and is sufficient if the SSFBG 106 is positioned within the holder 108. A second expansion-contraction absorbent 103 is interposed between the base member 104 and the holder 108.

The holder 108 supports the base member 104 via the second expansion-contraction absorbent 103. More specifically, the base member 104 is not fixed structurally by, for example, welding or soldering, attachment of screws, bolts, or pins, or adhesive. Accordingly, if force is applied to a portion of the base member 104 by direct touch or by close contact of another member, only the portion to which force is applied moves. The second expansion-contraction absorbent 103 absorbs expansion/contraction of the holder 108 that occurs along with temperature fluctuation. Thus, expansion/contraction of the holder 108 is not transmitted to the base member 104. As the second expansion-contraction absorbent 103, silicon grease, for example, may be used. If the base member 104 and the holder 108 are placed in intimate contact via the silicon grease, lubricity between the members is increased, and thus, not only can expansion/contraction of the holder 108 be absorbed, but in addition thermal conduction efficiency between the base member 104 and the holder 108 is improved. Note that, the second expansion-contraction absorbent 103 is not limited to being silicon grease, and may be any member that absorbs expansion/contraction of the holder 108 while keeping the base ember 104 and the holder 108 in intimate contact. Accordingly, a gel material or a viscous material may be used. It is favorable if the material has high thermal conductivity.

The base member 104 is engaged with the holder 108 at an engagement section 124. The engagement member 124 includes a protrusion formed in the base member 104 and a groove formed in the holder 108. As described above, the base member 104 is supported by the holder 108 and the casing 110. However, in either case the base member 104 is not fixed structurally. Accordingly, if the optical fiber 102 were pulled etc., the base member 104 would move in the extension direction of the optical fiber 102, and there is a possibility that the base member 104 would be pulled out from the casing 110. However, to address this potential problem, the protrusion of the base member 104 is inserted in and engaged with the groove of the holder 108, whereby the base member 104 is inhibited from being moved in the extension direction of the optical fiber 102.

Note that, it is favorable if a space of at least 0.5 mm is left between the protrusion and the groove so that expansion/contraction of the holder 108 is more reliably inhibited from being transmitted to the base member 104 at the engagement section 124. This space is occupied by the second expansion-contraction absorbent 103, in a manner like that described above.

Note that, hereinafter, the extension direction of the optical fiber 102 in the holder 108 will be referred to as the "longitudinal direction of the holder 108". Similarly, the extension direction of the optical fiber 102 in the casing 110 will be referred to as the "longitudinal direction of the casing 110". Further, the extension direction of the optical fiber 102 in the base member 104 will be referred to as the "longitudinal direction of the base member 104".

The base member 104 is supported in addition by the casing 110. More particularly, through holes through which the optical fiber 102 passes are formed at either end of the casing 110. In the wavelength tuning unit 100, the optical fiber 102 is inserted through the through holes of the casing 110 while fixed to the base member 104. More specifically, both ends of the base member 104 are also inserted through the respective through holes formed in the ends of the casing 110. The base member 104 is thus supported by the casing 110 via the first expansion-contraction absorbent 101 at the areas of the through holes at both ends of the casing 110.

Figure 6:
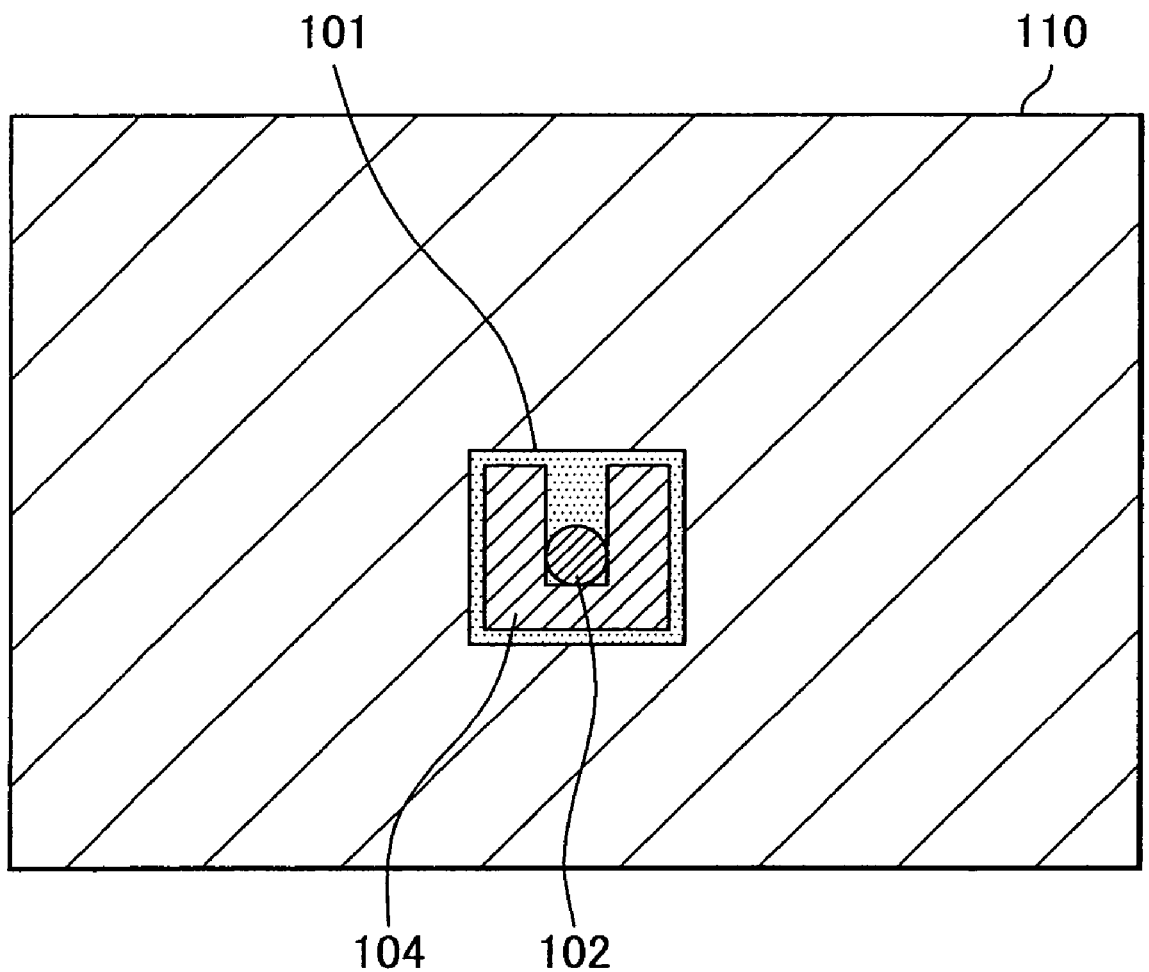
FIG. 6 is a cross sectional view along line cross section line A-A of FIG. 3.

The space between the base member 104 and the casing 110, as shown by the cross section view of FIG. 6 along the cross section line A-A of FIG. 3, is sealed by the first expansion-contraction absorbent 101. The casing 110 is supported by the base member 104 via the first expansion-contraction absorbent 101, but is not structurally fixed to the base member 104. Further, the first expansion-contraction absorbent 101 absorbs expansion/contraction of the casing 110 that occurs along with temperature fluctuation. Accordingly, the expansion/contraction of the casing 110 is not transmitted to the base member 104.

The first expansion-contraction absorbent 101 is used to seal the space between the through holes in the casing 110 and the base member 104 that is inserted there through. As a result of sealing the space, foreign matter, like dirt or moisture, is inhibited from entering inside the casing 110. As the first expansion-contraction absorbent 101, silicon rubber, for example, may be used. Since silicon rubber is flexible even after hardening, silicon rubber does not hold the base member 104 and the casing 110 rigidly, but instead allows expansion/contraction of the casing 110 to be absorbed. Note that, the first shock absorbing material 101 is not limited to being silicon rubber, and may be any member that is flexible after hardening, can absorb expansion/contraction of the casing 110, and that can seal the space between the through hole and the base member. Accordingly, a gel material or a viscous material may be used.

Returning to FIG. 3, the first temperature sensor 112 is positioned in a central area of the base member 104. Note that, it is not essential for the first temperature sensor 112 to be positioned in the central area, and is sufficient if the first temperature sensor 112 is positioned within the vicinity of the SSFBG 106. The first temperature sensor 112 detects the temperature of the base member 104. Note that, in FIG. 3, the first temperature sensor 112 is positioned in the engagement section 124. However, as mentioned above, so long as the first temperature sensor 112 is positioned within the vicinity of the SSFBG 106, it need not be in the engagement section 124.

The holder 108 is in contact with the thermo-module 116 and a heat insulating material 118. In addition, the holder 108 is fixed to the casing 110 using screws 102 that are made of a material with low thermal conductivity.

The thermo-module 116 is fixed to a section of the inside surface of the casing 110. The thermo-module 116 is in contact with the holder 108, and heats/cools the holder 108. The heat insulating material 118 is disposed at either side of the thermo-module 116 and is also fixed to the inside surface of the casing 110.

The second temperature sensor 126 is positioned at the upper surface of the casing 110. In FIG. 3, the second temperature sensor 126 is embedded in the casing 110 and disposed integrally with the casing 110. However, the invention is not limited to this example, and the second temperature sensor 126 may be positioned so as to protrude from the casing 110 or separately from the casing 110 at the outside periphery thereof. In addition, the position at which the second temperature sensor 126 is disposed is not limited to being at the top surface of the casing 110, but may be at the lower surface or one of the side surfaces of the casing 110.

The thermo-module 116, the first temperature sensor 112, and the second temperature sensor 126 are connected to the temperature controller 130 that is positioned outside of the casing 110. This completes the explanation of the relationship of the various structural members of the wavelength tuning unit 100. Next, the various structural members will be described in more detail.

The casing 110 is made of copper that has been surface gilded. However, the casing 110 is not limited to this material, and may use, for example, a material that is cheap and easily worked like aluminum. The casing 110 of the present embodiment has a box-shape, and has a terminal section provided on either one of the side surfaces in the longitudinal direction thereof. The terminal section includes a pair of electric power supply terminals for supply electric power to the thermo-module 116, and a pair of input terminals for an input of the first temperature sensor 112. The temperature controller 130 is connected to the casing 110 via the terminal section. In addition, a pair of electric power supply terminals for the second temperature sensor 126 is provided on the upper surface of the casing 110, and is connected to the temperature controller 130. If the second temperature sensor 126 is provided separately at the outer periphery of the casing 110, the second temperature sensor 126 and the thermo-controller may be directly connected.

The heat insulating material 118 is made of glass epoxy material. However, the invention is not limited to this, and for example, any material with low thermal conductivity such as PEEK material or mica may be used. Further, the heat insulating material 118 may be omitted, and the holder 108 held in a bridge-like manner by screws made of a material with lower thermal conductivity, and air or a vacuum used for heat insulation.

The thermo-module 116 is a heating-cooling module that uses a Peltier element. The present embodiment describes an example in which only one of the thermo-module 116 is provided. However, a plurality of thermo-modules 116 may be provided in accordance with the shape and dimensions of the holder 108.

The base member 104 is made of material with low thermal expansivity. As this material with low thermal expansivity, invar or glass-ceramic, for example, may be used. It is favorable that the base member 104 uses a material that has a coefficient of thermal expansion that is $1.2 \times 10^{-6}/K$ or less. The shape of the base member 104 is favorably a shape that encloses the fixed optical fiber 102. In the present embodiment, expansion/contraction of the holder 108 and the casing 110 is absorbed by the expansion-contraction absorbents, but depending on the extent of the expansion/contraction it is possible that not all of it would be absorbed. In this case, however, if the base member 104 has a shape that encloses the optical fiber 102, transmission of the expansion/contraction of the holder 108 and the casing 110 to the optical fiber 102 is inhibited since the rigidity of the base member 104 is greater than the stress transmitted by the expansion-contraction absorbents. The base member 104 of the present embodiment forms a groove for fixing the optical fiber 102, and has a prism shape with a concave cross section. Note that, the shape of the base member 104 is not limited to being a prism. So long as the shape is one that encloses the optical fiber, any shape may be used, such as a cylindrical shape with a cross section that is circular, or a shape with a V- or U-shaped cross section, etc. The length of the base member 104 in the longitudinal direction of the optical fiber 102 is equal to or longer than the length of the casing 110 in the longitudinal direction of the optical fiber 102.

The holder 108 is made of material with high thermal conductivity. As this material with high thermal conductivity, copper or aluminum, for example, may be used. It is favorable if the holder 108 is made of material with thermal conductivity of 398 W/(m·K) or more. The above described engagement section 124 is disposed in the central area in the longitudinal direction of the holder 108. In the case that the holder 108 is evenly heated/cooled, the holder 108 expands/contracts centering on the central area in the longitudinal direction thereof. Accordingly, positioning of the engagement section 124 in the central area makes it less likely that positional misalignment will be caused by expansion/contraction.

The first temperature sensor 112 and the second temperature sensor 126 are both thermistors. However, the invention is not limited to this, and, for example, thermocouples or platinum thermal resistors may be used.

Figure 5:
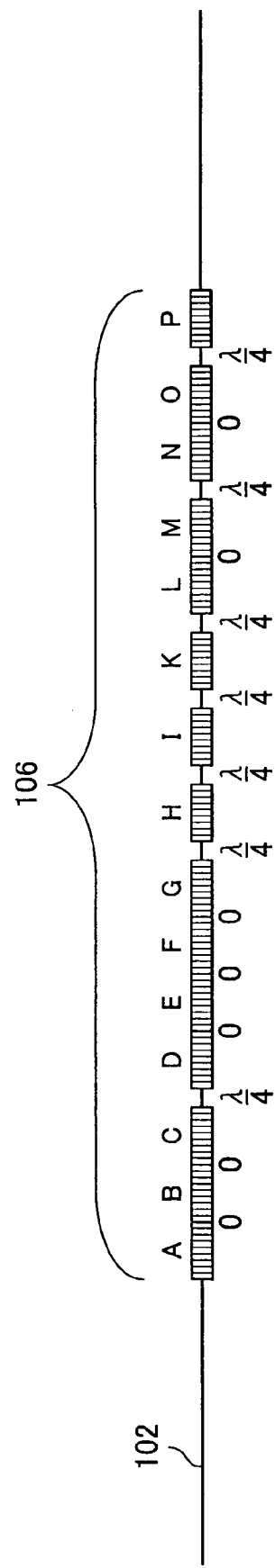
FIG. 5 is an explanatory drawing showing the structure of an SSFBG of the first embodiment.

The optical fiber 102 is a single mode optical fiber having increased ultraviolet sensitivity and germanium or the like doped to the core, and in which the SSFBG 106 with the multi-phase shift structure is formed. FIG. 5 shows an outline of the structure of the SSFBG 106 in an example in which a 15-bit M-sequence is used for the encoding sequence. In FIG. 5, the unit FBGs indicated by "A" to "P" all have the same length and the same period for the modulation range of the refractive index. In this example, the marking "λ/4" shown in the gaps between the unit FBGs "C" and "D" and "G" and "H" indicates an arrangement of the unit FBGs in which intervals corresponding to λ/4 are provided when the wavelength of the optical carrier is λ. Further, the marking "0" indicates that the unit FBGs are arranged in intimate contact with each other (i.e., there is an interval of 0 therebetween). The interval corresponding to the above λ/4 is an interval that corresponds to a phase π/2 of the optical carrier. Accordingly, for example, if the optical pulse is incident from the left side of FIG. 5 (the side of the unit FBG "A"), the phase of the reflected pulse of the unit FBGs "D", "E", "F" and "G" is π shifted with respect to the reflected pulse of the unit FBGs "A", "B" and "C".

Next, the various structural members of the wavelength tuning unit 100 will be explained. First, FIG. 4 will be used to describe the temperature controller 130. The temperature controller 130 is provided with a wavelength characteristic data storage portion 132 that stores wavelength characteristic data indicating the characteristics of the reflected wavelength of the FBG when temperature fluctuation occurs. As described previously, the temperature controller 130 is connected to the first temperature sensor 112, the thermo-module 116, and the second temperature sensor 126. The temperature controller 130 controls the thermo-module 116 such that the temperature detected by the first temperature sensor 112 is maintained at a desired temperature. In addition, the temperature controller 130 controls the thermo-module 116 based on the external temperature detected by the second temperature sensor 126 such that the temperature detected by the first temperature sensor 112 is maintained at a desired temperature.

Wavelength Tuning Based on Set Temperature

Next, the performance of wavelength tuning based on a set temperature set by the temperature controller 130 will be explained. Wavelength tuning of the wavelength tuning unit 100 is performed by changing the temperature of the optical fiber 102 including the SSFBG 106. More specifically, the wavelength tuning unit 100 controls the temperature of each unit FBG included in the SSFBG 106 in order to control the reflected wavelength of the FBG and thus adjust the wavelength of the overall SSFBG 106.

When the set temperature is set to a predetermined value in the temperature controller 130, the temperature controller 130 controls heating/cooling of the thermo-module 116 such that the detection temperature of the temperature sensor 112 becomes equal to the set value based on the difference between the set value and the detection temperature of the first temperature sensor 112. Heat from the thermo-module 116 is transmitted to the base member 104 via the holder 108. More specifically, the thermo-module 116 heats/cools the base member 104 via the holder 108. Accordingly, control of the thermo-module 116 by the temperature controller 130 maintains the base member 104 at the predetermined temperature.

Note that, since the high thermal conductivity holder 108 that transmits the heat of the thermo-module 116 to the base member 104 covers the base member 104, it is possible to control the temperature distribution generated in the longitudinal direction of the base member 104.

In addition, the base member 104 is not structurally fixed to the holder 108, and is only supported via the second expansion-contraction absorbent 103. Accordingly, expansion/contraction of the holder 108 generated by heating/cooling of the thermo-module 116 is not transmitted to the base member 104. Further, the base member 104 is also not structurally fixed to the casing 110, and is only supported via the first expansion-contraction absorbent 101. Thus, expansion/contraction of the casing 110 generated by fluctuation of the ambient temperature is not transmitted to the base member 104. Moreover, since the base member 104 is made of material with low thermal expansivity, the base member 104 itself does not expand/contract.

Because the SSFBG 106 included in the optical fiber 102 is fixed to the base member 104, expansion/contraction of the holder 108 and the casing 110 etc. is not transmitted to the SSFBG 106. More specifically, expansion/contraction of the holder 108 and the casing 110 etc. does not cause the stresses applied to the SSFBG 106 to change. Even if the holder 108 and the casing 110 etc. expand/contract, the reflected wavelength of each unit FBG in the SSFBG 106 does not vary, and thus the wavelength of the SSFBG 106 does not vary. Accordingly, the wavelength of the SSFBG 106 only varies in accordance with temperature fluctuation. In other words, the reflected wavelength of the SSFBG 106 can be controlled based on temperature alone.

Figure 7:
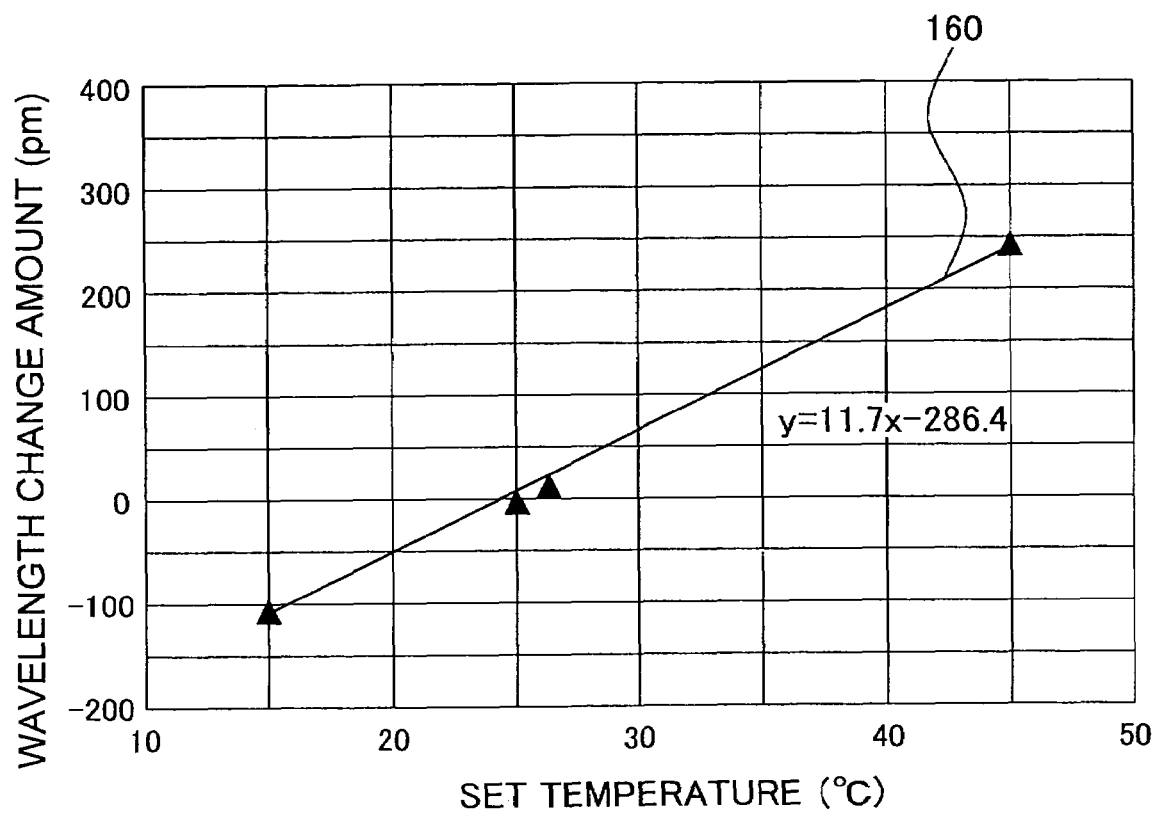
FIG. 7 is a graph showing a wavelength tuning characteristic that depends upon a set temperature in the first embodiment.

FIG. 7 shows the wavelength tuning characteristics depending on the set temperature of the temperature controller 130 in the wavelength tuning unit 100 according to the present embodiment. The horizontal axis of the FIG. 7 shows the set temperature of the temperature controller 130, and the vertical axis shows the change amount of the reflected wavelength of the SSFBG 106. FIG. 7 shows measurement points indicated by black triangles and a straight line 160 showing smoothed values for the respective measurement points. The straight line 160 is expressed by the following expression.

$$y=11.7x-286.4 \qquad \text{Expression 1}$$

The reflected wavelength of the wavelength tuning unit 100 can be tuned by 300 pm or more between set temperatures of 15° C. and 45° C. Accordingly, ample wavelength tuning can be performed in accordance with, for example, fluctuations of the light source wavelength. The temperature controller 130 according to the present embodiment can set the temperature in units of 0.1° C., and thus the reflected central wavelength of the wavelength tuning unit 100 can be tuned with a wavelength tuning resolution of 1 pm.

Wavelength Stability

The above description completes the explanation of wavelength tuning based on the set temperature. Next, wavelength stability of the wavelength tuning unit 100 according to the present embodiment will be described. If the ambient temperature that is the external temperature of the wavelength tuning unit 100 fluctuates, the casing 110 expands/contracts along with the fluctuation in the ambient temperature. However, as described previously, the SSFBG 106 is only adhered and fixed to the base member 104, and the base member 104 is not structurally fixed to the either the holder 108 or the casing 110. Further, the first expansion-contraction absorbent 101 is flexible and thus absorbs expansion/contraction of the casing 110, and the base member 104 is harder than the expansion-contraction absorbent 101 and thus expansion/contraction of the casing 110 is not transmitted to the SSFBG 106. As a result of the above structure, wavelength variation of the SSFBG 106 does not occur as a result of stress.

Moreover, since the holder 108 covers the periphery of the base member 104, heating/cooling of the thermo-module 116 can be adequately transmitted, and the set temperature (set wavelength) can be maintained without generating an uneven temperature distribution in the base member 104 (in particular in the region of the SSFBG).

Figure 8:
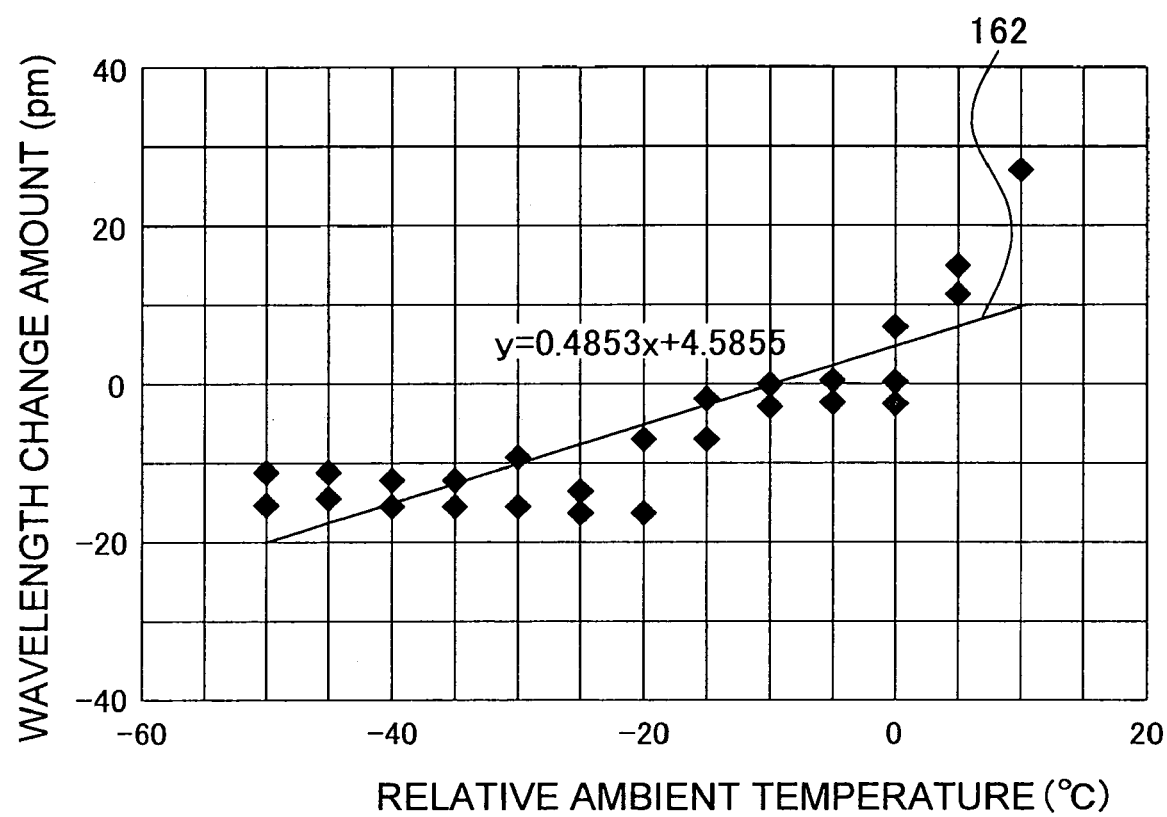
FIG. 8 is a graph showing the ambient temperature dependence of a reflected wavelength of the wavelength tuning unit of the first embodiment.

FIG. 8 shows the ambient temperature dependence of the reflected wavelength in the wavelength tuning unit 100 of the present embodiment in the case that the set temperature of the temperature controller 130 is set at 45° C. The horizontal axis of FIG. 8 shows the relative ambient temperature, and the vertical axis shows the change amount of the reflected wavelength of the SSFBG 106. Here, the relative ambient temperature is the difference between the set temperature that is set by the temperature controller 130, and the ambient temperature. FIG. 8 shows measurement points indicated by black diamonds, and a straight line 162 indicating smoothed values for the respective measurement points. The straight line 162 is expressed by the following expression.

$$y=0.4853x+4.5855 \qquad \text{Expression 2}$$

As is apparent from FIG. 8, the maximum wavelength variation amount in the range of relative ambient temperatures between −50° C. and +10° C. is 27 pm, and the degree of variation of the wavelength is 0.5 pm per 1° C.

The wavelength tuning characteristic data indicating the relationship of the set temperature and the reflected wavelength shown in FIG. 7 and the wavelength variation characteristic data indicating the relationship between the relative ambient temperature and the variation of the reflected wavelength shown in FIG. 8 are stored as wavelength characteristic data in the wavelength characteristic data storage portion 132 provided in the temperature controller 130.

Wavelength Tuning Method with Respect to Ambient Temperature Fluctuation

The above description completes the explanation about wavelength stability of the wavelength tuning unit 100. Next, a wavelength tuning method of the wavelength tuning device with respect to fluctuation in the ambient temperature will be explained.

When a predetermined wavelength is set in the temperature controller 130, the set temperature of the thermo-module 116 is calculated from the wavelength characteristic data stored in the wavelength characteristic data storage portion 132 provided in the temperature controller 130 based on the temperature of the casing 110 detected by the second temperature sensor 126. Heating/cooling of the thermo-module 116 is then controlled by the temperature controller 130 such that the temperature of the base member 104 detected by the first temperature sensor 112 becomes equal to the set temperature.

Note that, in the case that the temperature of the casing 110 (≈the ambient temperature) detected by the second temperature sensor 126 fluctuates, the set temperature of the thermo-module 116 is calculated again from the temperature change amount of the casing 110 and the wavelength characteristic data stored in the wavelength characteristic data storage portion 132. Then, the temperature of the base member 104 is re-adjusted such that the predetermined reflected wavelength is attained. As a result of repeatedly re-adjusting as necessary the set temperature in accordance with variation in the temperature of the casing 110 (≈the ambient temperature) detected by the second temperature sensor 126 in the above manner, the set wavelength can be automatically and stably maintained.

Next, FIG. 9 will be used to explain the operation of the wavelength tuning device when wavelength tuning is being performed. This example will explain the operation of the wavelength tuning unit 100 in the case that the wavelength is 1550.000 nm when the set temperature of the thermo-module 116 is 25° C. under an ambient temperature of 25° C., the wavelength tuning characteristic is 10 pm/° C., and the wavelength variation characteristic dependent upon the relative ambient temperature is 0.5 pm/° C. First, the set wavelength (1550.000 nm) is input (step S100). Then, the ambient temperature (25° C.) is detected by the second temperature sensor 126 (step S102).

Next, it is determined whether the ambient temperature detected in step S102 is fluctuating (step S104). If it is determined that the ambient temperature detected in step S102 is not fluctuating, or if the ambient temperature is being detected for the first time, the set temperature of the thermo-module 116 is calculated (step S108). In the case that the wavelength is 1550.100 nm under an ambient temperature of 25° C., a set temperature of 35° C. is calculated based on the following expression.

$$T_{set}=25°\ C.+(1550.100\ nm-1550.000\ nm)/10\ pm/°\ C.)=35°\ C. \qquad \text{Expression 3}$$

The temperature controller 130 sets the temperature calculated using Expression 3 (35° C.) as temperature of the thermo-module 116. In this case, the relative ambient temperature is −10° C. (the ambient temperature of 25° C.−the set temperature of 35° C.). Since the wavelength variation characteristic of the wavelength tuning unit 100 is 0.5 pm/° C., it can be estimated that there will be a −5 pm wavelength variation with respect to the wavelength tuning caused by the set temperature. Given that the wavelength tuning characteristic of the wavelength tuning unit 100 is 10 pm/° C., in order to suppress a wavelength variation of −5 pm, the set temperature is raised by 0.5° C. In other words, in step S108, the set temperature of the thermo-module 116 is calculated to be 35.5° C., and the set temperature of the thermo-module 116 is controlled to be 35.5° C. (step S110). At this time, the relative ambient temperature changes by another 0.5° C., but this can be ignored since the wavelength variation caused by this relative ambient temperature fluctuation is minute.

After the holder 108 has been heated/cooled by the thermo-module 116 in step S110, the temperature of the base member 104 is detected by the first temperature sensor 112 (step S112). Then, it is determined whether the detection temperature of the first temperature sensor 112 detected in step S112 and the set temperature calculated in step S108 are equal (step S114). If it is determined that the detection temperature of the first temperature sensor 112 and the set temperature are not equal in step S114, steps S110 and S112 are repeatedly performed until the temperature detected by the first temperature sensor 112 and the set temperature become equal.

If it is determined in step S114 that the temperature detected by the first temperature sensor 112 and the set temperature are equal, the ambient temperature is detected again by the second temperature sensor 126 in step S102. In this example, where the ambient temperature has become 27° C., it is determined in step S104 that the ambient temperature is fluctuating, and thus the relative ambient temperature is calculated (step S106). Since the ambient temperature is 27° C., as compared to the set temperature of 35.5° C., a relative ambient temperature of −8.5° C. is calculated in step S106. Given the change amount of the relative ambient temperature and the wavelength variation characteristic, it can be estimated that there will be +1 pm wavelength variation. Accordingly, the temperature controller 130 sets the set temperature 0.1° C. lower in order to suppress this wavelength variation. In other words, in step S108, the set temperature of the thermo-module 116 is calculated to be 35.4° C., and the set temperature of the thermo-module 116 is controlled to be 35.4° C. At this time, the relative ambient temperature changes by another 0.1° C., but this can be ignored since the wavelength variation caused by this relative ambient temperature fluctuation is minute.

In this way, the set temperature of the thermo-module 116 is repeatedly re-adjusted by the temperature controller 130, thereby allowing a predetermined reflected wavelength to be stably maintained even if the ambient temperature fluctuates.

This completes the explanation of the wavelength tuning method with respect to fluctuation in the ambient temperature. According to the first embodiment, an phase coding OCDM encoder/decoder is provided that can selectively tune a wavelength in a wavelength tuning range of 300 pm or more with a wavelength tuning resolution of 1 pm or less. This phase coding OCDM encoder/decoder is inexpensive and has a simple structure. Further, according to the first embodiment, the wavelengths of the paired phase encoder and phase decoder can be matched with high accuracy without manufacturing error of the SSFBG included in the phase encoder/decoder having any impact.

In addition, according to the wavelength tuning method of the present embodiment, the reflected wavelengths of the phase encoder and phase decoder can be stably maintained at a predetermined wavelength by automatically performing re-tuning for minute wavelength variations caused by fluctuations in the ambient temperature, even if differences in set-ambient temperature are not considered.

Second Embodiment

Next, a second embodiment of the invention will be explained. The second embodiment describes an example in which the wavelength tuning device according to the present invention is applied as a wavelength tuning unit 200 that can be used as an encoder/decoder in phase coding OCDM. The wavelength tuning unit 200 according to the second embodiment has substantially the same structure and functions as the wavelength tuning unit 100 according to the first embodiment. However, the wavelength tuning unit 200 differs from the wavelength tuning unit 100 in that the base member is surrounded by a holder made of material with high thermal conductivity and a cover made of a material with low thermal conductivity. Hereinafter, structural members that have substantially the same structure and function as those in the wavelength tuning unit 100 will be denoted with the same reference numerals in the figures, and an explanation of these members will be omitted. The explanation will focus on the sections that differ from the wavelength tuning unit 100.

Explanation of the Structure

FIG. 10 shows a cross section of the structure of the wavelength tuning unit 200. In the wavelength tuning unit 200, the base member 104 is supported by a holder 208 via the second expansion-contraction absorbent 103. In the first embodiment, the holder 108 has a shape that surrounds the entire outside periphery of the base member. However, in the present embodiment, the holder 208 has a box-shape with an open top section, and the base member is mounted on the lower section of the holder 208. Thus, the holder 208 has a shape that encloses a section of the outside periphery of the base member. The open top section of the holder 208 is covered by a cover 210, which is one example of a thermal conduction inhibiting member. The holder 208 is made of material with high thermal conductivity like the holder 108 of the first embodiment. The cover 210 is made of material with low thermal conductivity. This material with low thermal conductivity may be, for example, glass epoxy material or PEEK material. In addition, it is favorable if the cover 210 is made of material having thermal conductivity of 0.8 W/(m·K) or less.

Figure 11A:
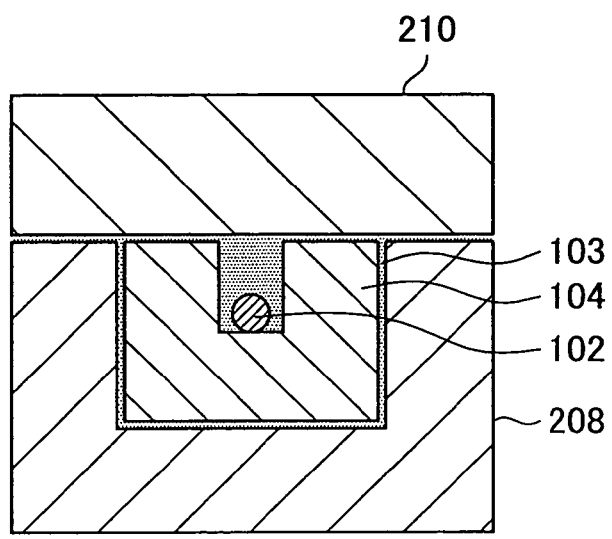
FIG. 11 is a cross sectional view along the cross section line B-B of FIG. 10.

FIG. 11A is a cross section view along the cross section line B-B of FIG. 10. As shown by FIG. 11A, the holder 208 has a concave cross section, with all sections of the periphery of the base member 104 except the top section being enclosed. The second expansion-contraction absorbent 103 is interposed between the holder 208 and the base member 104 as in the first embodiment. The holder 208 supports the base member 104 via the second expansion-contraction absorbent 103, and conducts heat from the thermo-module 116 to the base member 104.

The cover 210 covers the holder 208 and the top section of the base member 104, namely, the opposite side of the holder 208 from the contact section (lower surface) that contacts with the thermo-module 116. The second expansion-contraction absorbent 103 is interposed between the cover 210 and the base member 104 and the holder 208. Accordingly, the cover 210 and the base member 104, and the cover 210 and the holder 208 are in intimate contact with each via the second expansion-contraction absorbent 103. Thus, the base member 104 is surrounded by the holder 208 and the cover 210 via the second expansion-contraction absorbent 103. As a result of adopting this structure, the thermo-module 116 can heat/cool the base member 104 via the holder 208, while ambient temperature fluctuation is inhibited from being transmitted to the base member 104 by the cover 210. Thus, as compared to the first embodiment, generation of uneven temperature distribution in the longitudinal direction of the base member 104 can be more reliably inhibited.

Figure 11B:
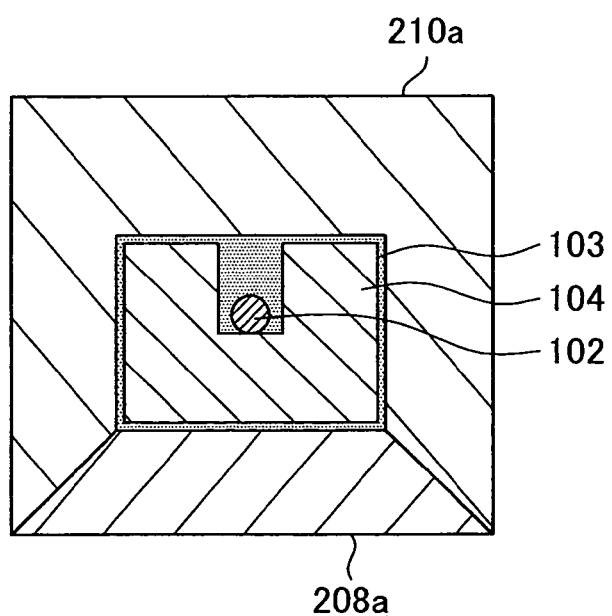

Note that, in the above description, the thermal conduction inhibiting member is provided separately from the holder 208 as the cover 210. However, the thermal conduction inhibiting member may be integrated with the holder 208. For example, as shown in FIG. 11B, the section extending from the contact section with the thermo-module 116 to the lower surface of the base member 104 (the region indicated by reference numeral 208a) may be made of material with high thermal conductivity so as to correspond with the holder, and the section surrounding the side surfaces and the upper section of the base member 104 (the region indicated by reference numeral 210a) may be made of material with low thermal conductivity so as to correspond to the thermal conduction inhibiting member. Note that, the ratio of the section made of material with high thermal conductivity and the section made of material with low thermal conductivity may be set as appropriate. However, at the least, it is favorable that a region extending from the section that contacts with the thermo-module 116 to a section of the base member 104 is made of material having high thermal conductivity so that heat from the thermo-module 116 can be efficiently conducted to the base member 104.

In the present embodiment, as in the first embodiment, the first temperature sensor 112, the second temperature sensor 126 and the thermo-module 116 are connected to the temperature controller 130. Since the relationship of the first temperature sensor 112, the second temperature sensor 126, the thermo-module 116, and the temperature controller 130, and the function of the temperature controller 130, are the same as those in the first embodiment, a description thereof is omitted here.

Wavelength Tuning Based on Set Temperature

Wavelength tuning of the wavelength tuning unit 200, like the wavelength tuning of the wavelength tuning unit 100, is performed by changing the temperature of the optical fiber 102 including the SSFBG 106. When the set temperature is set to a predetermined value in the temperature controller 130, the temperature controller 130 controls heating/cooling of the thermo-module 116 such that the detection temperature of the temperature sensor 112 becomes equal to the set value based on the difference between the set value and the detection temperature of the first temperature sensor 112. Heat from the thermo-module 116 is transmitted to the base member 104 via the holder 208. More specifically, the thermo-module 116 heats/cools the base member 104 via the holder 208. Accordingly, control of the thermo-module 116 by the temperature controller 130 maintains the base member 104 at the predetermined temperature.

Note that, the base member 104 is heated/cooled by conduction of heat from the holder 208 that is heated/cooled by the thermo-module 116. Since the holder 208 made of high thermal conductivity material covers the lower surface and both longitudinal direction side surfaces of the base member 104, the generation of an uneven temperature distribution in the longitudinal direction of the base member 104 can be suppressed. Further, the cover 210 made of low thermal conductivity material covers the top surface of the base member 104 and the holder 208. Accordingly, temperature variation caused by thermal radiation via the casing 110 can be suppressed. Therefore, the generation of an uneven temperature distribution in the longitudinal direction of the base member 104 can be suppressed still further.

In addition, the holder 208 and the cover 210 are not structurally fixed to the base member 104, but are only in intimate contact therewith via the silicon grease. Accordingly, expansion/contraction of the holder 208 and the cover 210 generated by heating/cooling of the thermo-module 116 is not transmitted to the base member 104. In addition, since the base member 104 is made of material with low thermal expansivity, the base member 104 itself does not expand/contract. The SSFBG 106 included in the optical fiber 102 is fixed to the base member 104. Accordingly, only the temperature of the SSFBG 106 changes along with changes in the temperature of the base member 104, thereby allowing the reflected wavelength of the SSFBG 106 to be controlled using temperature alone.

Figure 12:
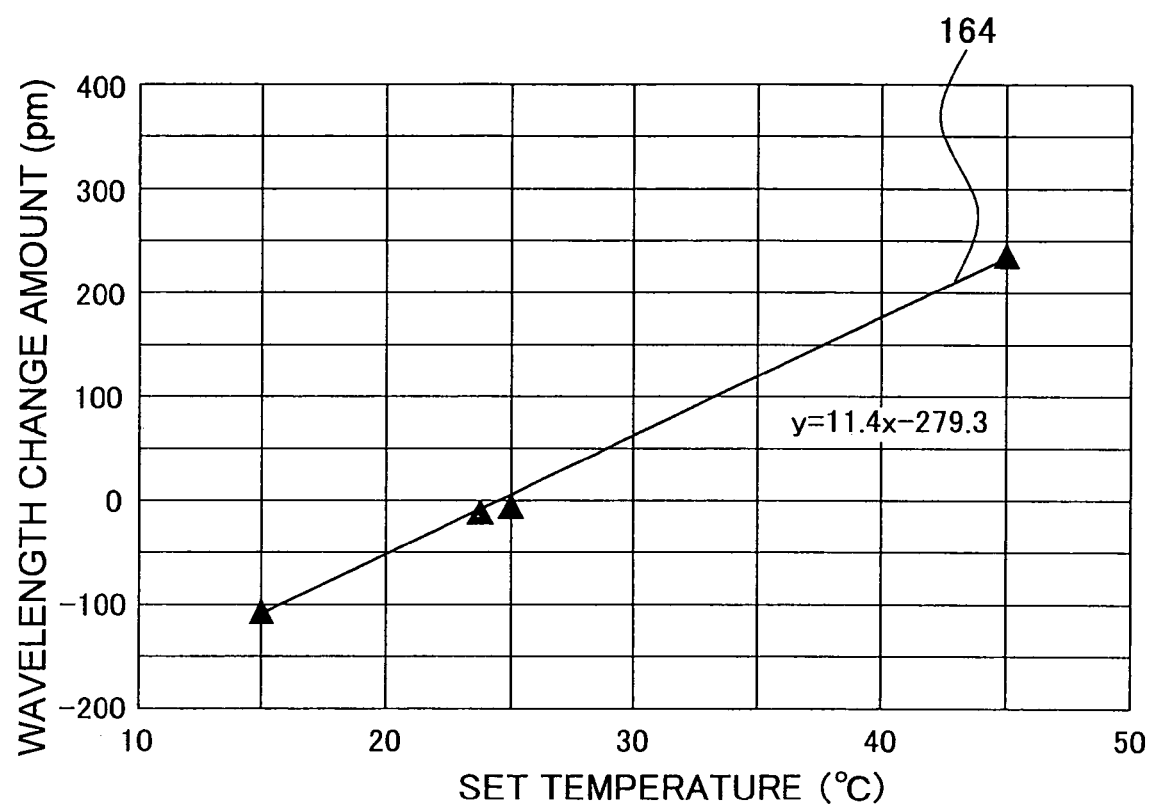
FIG. 12 is a graph showing a wavelength tuning characteristic that depends upon a set temperature in the second embodiment.

FIG. 12 shows the wavelength tuning characteristics depending on the set temperature of the temperature controller 130 in the wavelength tuning unit 200 of the present embodiment. The horizontal axis of FIG. 12 shows the set temperature of the temperature controller 130, and the vertical axis shows the change amount of the reflected wavelength of the SSFBG 106. FIG. 12 shows measurement points indicated by black triangles and a straight line 164 showing smoothed values for the respective measurement points. The straight line 164 is expressed by the following expression.

$$y = 11.4x - 279.3 \quad \text{Expression 4}$$

The reflected wavelength of the wavelength tuning unit 200 can be tuned by 300 pm or more between set temperatures of 15° C. and 45° C. Accordingly, ample wavelength tuning can be performed in accordance with, for example, fluctuations of the light source wavelength. The temperature controller 130 according to the present embodiment can set the temperature in units of 0.1° C., and thus the reflected central wavelength of the wavelength tuning unit 200 can be tuned with a wavelength tuning resolution of 1 pm.

Wavelength Stability

The above description completes the explanation of wavelength tuning based on the set temperature. Next, wavelength stability of the wavelength tuning unit 200 according to the present embodiment will be described. If the ambient temperature that is the external temperature of the wavelength tuning unit 200 fluctuates, the casing 110 expands/contracts along with the fluctuation in the ambient temperature. However, the SSFBG 106 is only adhered and fixed to the base member 104, and the base member 104 is not structurally fixed to any one of the holder 208, the cover 210, or the casing 110. Further, the first expansion-contraction absorbent 101 is flexible and thus absorbs expansion/contraction of the casing 110, and the base member 104 is harder than the expansion-contraction absorbent 101 and thus expansion/contraction of the casing 110 is not transmitted to the SSFBG 106. As a result of the above structure, wavelength variation of the SSFBG 106 does not occur as a result of stress. In addition, the periphery of the base member 104 is covered by the holder 208 and the cover 210. Accordingly, heating/cooling of the thermo-module 116 can be adequately transmitted, and the set temperature (set wavelength) can be maintained without generating an uneven temperature distribution in the base member 104 (in particular in the region of the SSFBG).

Figure 13:
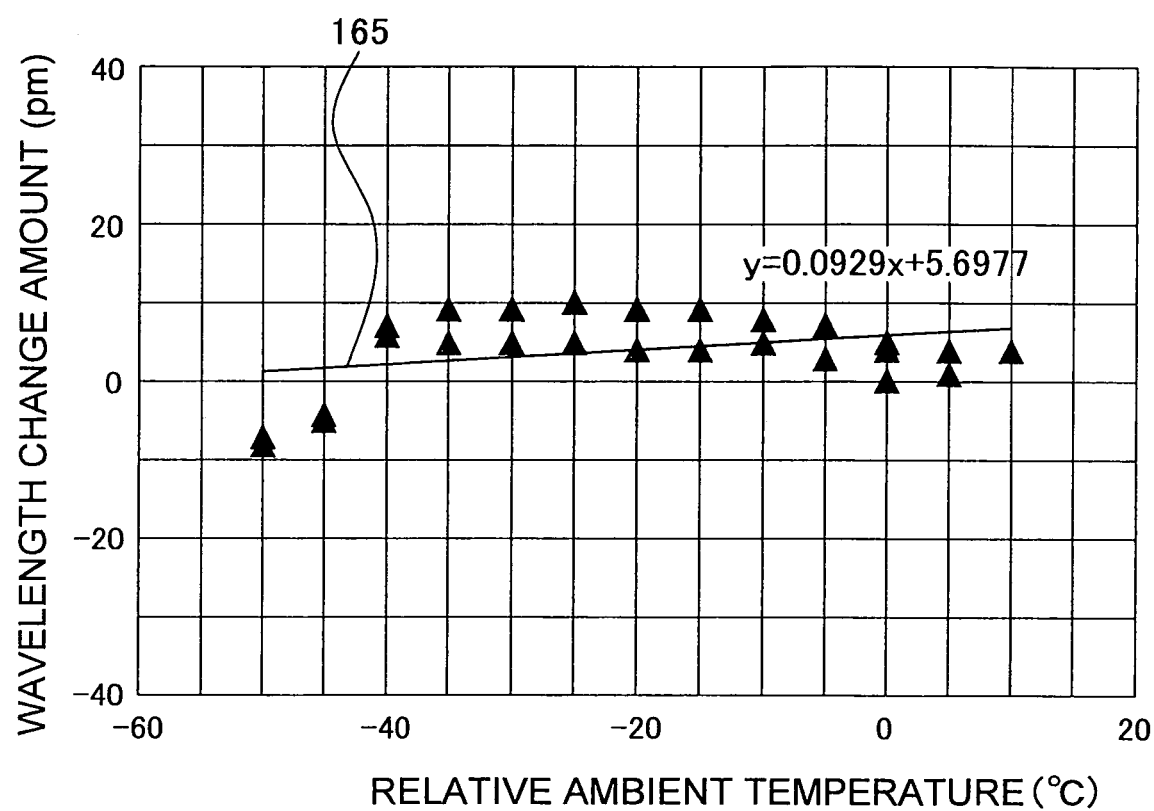
FIG. 13 is a graph showing the ambient temperature dependence of a reflected wavelength of the wavelength tuning unit of the second embodiment.

FIG. 13 shows the ambient temperature dependence of the reflected wavelength in the wavelength tuning unit 200 of the present embodiment in the case that the set temperature of the temperature controller 130 is set at 45° C. The horizontal axis of FIG. 13 shows the relative ambient temperature, and the vertical axis shows the change amount of the reflected wavelength of the SSFBG 106. FIG. 13 shows measurement points indicated by black diamonds, and a straight line 165 indicating smoothed values for the respective measurement points. The straight line 165 is expressed by the following expression.

$$y = 0.0929\, x + 5.6977 \quad \text{Expression 5}$$

As is apparent from FIG. 13, the maximum wavelength variation amount in the range of relative ambient temperatures between −50° C. and 10° C. is 10 pm, and the wavelength degree of variation is 0.09 pm per 1° C.

Wavelength Tuning Method with Respect to Ambient Temperature Fluctuation

The above description completes the explanation about wavelength stability of the wavelength tuning unit 200. Next, a wavelength tuning method of the wavelength tuning device with respect to fluctuation in the ambient temperature will be explained.

When a predetermined wavelength is set in the temperature controller 130, the set temperature of the thermo-module 116 is calculated from the wavelength characteristic data stored in the wavelength characteristic data storage portion 132 provided in the temperature controller 130 based on the temperature of the casing 110 detected by the second temperature sensor 126. Heating/cooling of the thermo-module 116 is then controlled by the temperature controller 130 such that the temperature of the base member 104 detected by the first temperature sensor 112 becomes equal to the set temperature.

Note that, in the case that the temperature of the casing 110 (≈ the ambient temperature) detected by the second temperature sensor 126 fluctuates, the set temperature of the thermo-module 116 is calculated again from the temperature change amount of the casing 110 and the wavelength characteristic data. Then, the temperature of the base member 104 is re-adjusted such that the predetermined reflected wavelength is attained. As a result of repeatedly re-adjusting as necessary the set temperature in accordance with variation in the temperature of the casing 110 (≈the ambient temperature) detected by the second temperature sensor 126 in the above manner, the set wavelength can be automatically and stably maintained.

Next, the operation of the wavelength tuning device when wavelength tuning is being performed will be explained. This example will explain the operation of the wavelength tuning unit 200 in the case that the wavelength is 1550.000 nm when the set temperature of the thermo-module 116 is 25° C. under an ambient temperature of 25° C., the wavelength tuning characteristic is 10 pm/° C., and the wavelength variation characteristic dependent upon the relative ambient temperature is 0.09 pm/° C. In order to set the wavelength at 1550.100 nm under an ambient temperature of 25° C., a set temperature of 35° C. is calculated based on the following expression.

$$T_{set} = 25°\text{ C.} + (1550.100\text{ nm} - 1550.000\text{ nm})/(10\text{ pm/}° \text{C.}) = 35°\text{ C.} \quad \text{Expression 6}$$

The temperature controller 130 sets the temperature calculated using Expression 6 (35° C.) as the temperature of the thermo-module 116. In this case, the relative ambient temperature is −10° C. (the ambient temperature 25° C.−the set temperature 25° C.). Since the wavelength variation characteristic of the wavelength tuning unit 200 is 0.09 pm/° C., it can be estimated that there will be a −0.9 pm wavelength variation with respect to the wavelength tuning caused by the set temperature. Given that the wavelength tuning characteristic of the wavelength tuning unit 200 is 10 pm/° C., in order to suppress a wavelength variation of −0.9 pm, the set temperature is raised by 0.1° C. In other words, the set temperature of the thermo-module 116 is calculated to 35.1° C., and the set temperature of the thermo-module 116 is controlled to be 35.1° C. At this time, the relative ambient temperature changes by another 0.1° C., but this can be ignored since the wavelength variation caused by this relative ambient temperature fluctuation is minute.

In addition, when the ambient temperature becomes 45° C., the relative ambient temperature is calculated to be +10° C. Given the change amount of the relative ambient temperature and the wavelength variation characteristic, it can be estimated that there will be +1.8 pm wavelength variation. Accordingly, the temperature controller 130 sets the set temperature 0.2° C. lower in order to suppress this wavelength variation. In other words, the set temperature of the thermo-module 116 is calculated to be 34.9° C., and the set temperature of the thermo-module 116 is controlled to be 34.9° C. At this time, the relative ambient temperature changes by another 0.1° C., but this can be ignored since the wavelength variation caused by this relative ambient temperature fluctuation is minute.

Figure 14:
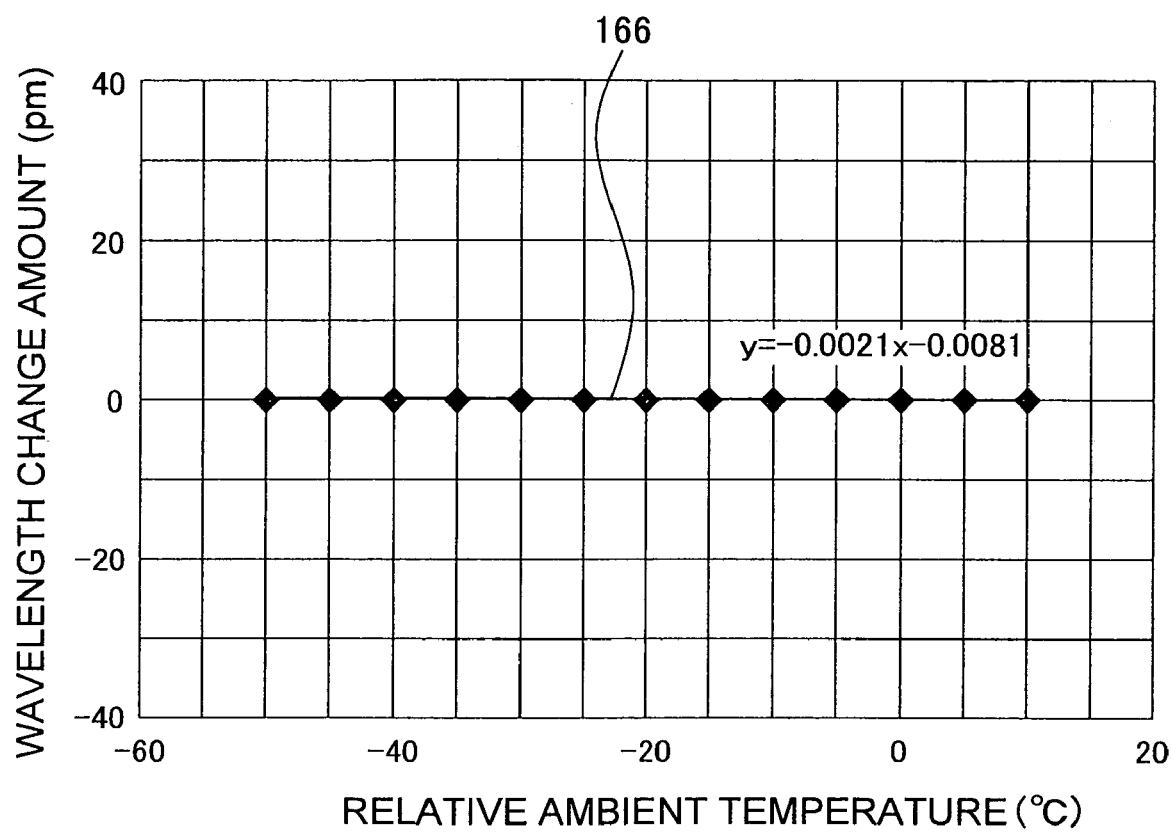
FIG. 14 is a graph showing the ambient temperature dependence of the reflected wavelength of the wavelength tuning unit when wavelength tuning is being performed in the second embodiment.

In this way, the set temperature of the thermo-module 116 is repeatedly and automatically re-adjusted by the temperature controller 130, thereby allowing a predetermined reflected wavelength to be stably maintained even if the ambient temperature fluctuates. FIG. 14 shows the ambient temperature dependence of the reflected wavelength of the wavelength tuning unit when wavelength tuning is performed using the temperature controller 130, and FIG. 13 shows a case when wavelength tuning is not performed. As is clear by comparing FIG. 14 with FIG. 13, when wavelength tuning is performed, wavelength variations caused by slight occurrence of ambient temperature fluctuations are corrected, and wavelength is reliably controlled.

In the wavelength tuning unit 200 according to the present embodiment, the base member 104 is evenly heated/cooled by heat conducted from the holder 208, and the temperature variation caused by thermal radiation via the casing 110 is suppressed by the cover 210. Accordingly, the generation of an uneven temperature distribution in the longitudinal direction of the base member 104 is suppressed. The SSFBG 106 included in the wavelength tuning unit 200 of the present embodiment, as described previously, includes the plurality of individual unit FBGs. If there is an uneven temperature distribution in the longitudinal direction of the base member 104, this will cause the temperatures of the respective individual unit FBGs to be different. If this occurs, the encoding characteristics will differ (or the decoding characteristics in the case of the phase decoder). For example, there may be difference in the reflected wavelengths of the individual unit FBGs, fluctuation in the reflected wavelength of the wavelength tuning unit 200 as a whole, or change in the relative phase difference of the optical pulse sequence forming the code etc.

Figure 15:
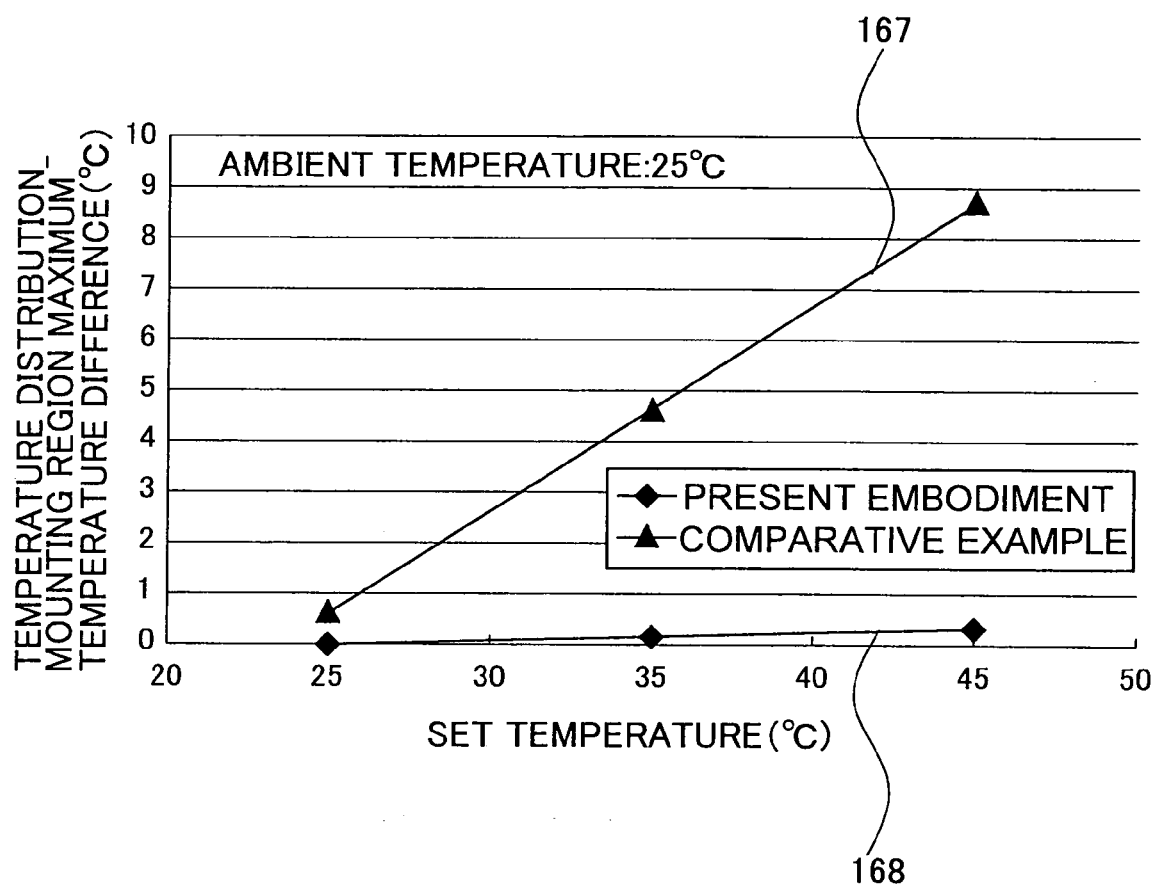
FIG. 15 is a graph showing a maximum temperature difference of a base member that varies along with change in the set temperature in the second embodiment.

FIG. 15 shows the results of an investigation of the temperature distribution of the surface of the base member 104 when the set temperature of the temperature controller 130 is set at 25° C., 35° C. and 45° C. under an ambient temperature of 25° C. for the wavelength tuning unit 200 of the present embodiment. FIG. 15 also shows the temperature distribution of a comparative example in which the temperature controller 130 is not provided to perform temperature adjustment. In the case of the comparative example, there is a maximum temperature difference of around 9° C. However, the maximum temperature difference of the wavelength tuning unit 200 of the present embodiment is 0.3° C. This result agrees with FIG. 13, which suggest that the reflected wavelength is stable with respect to ambient temperature fluctuation.

Figure 16:
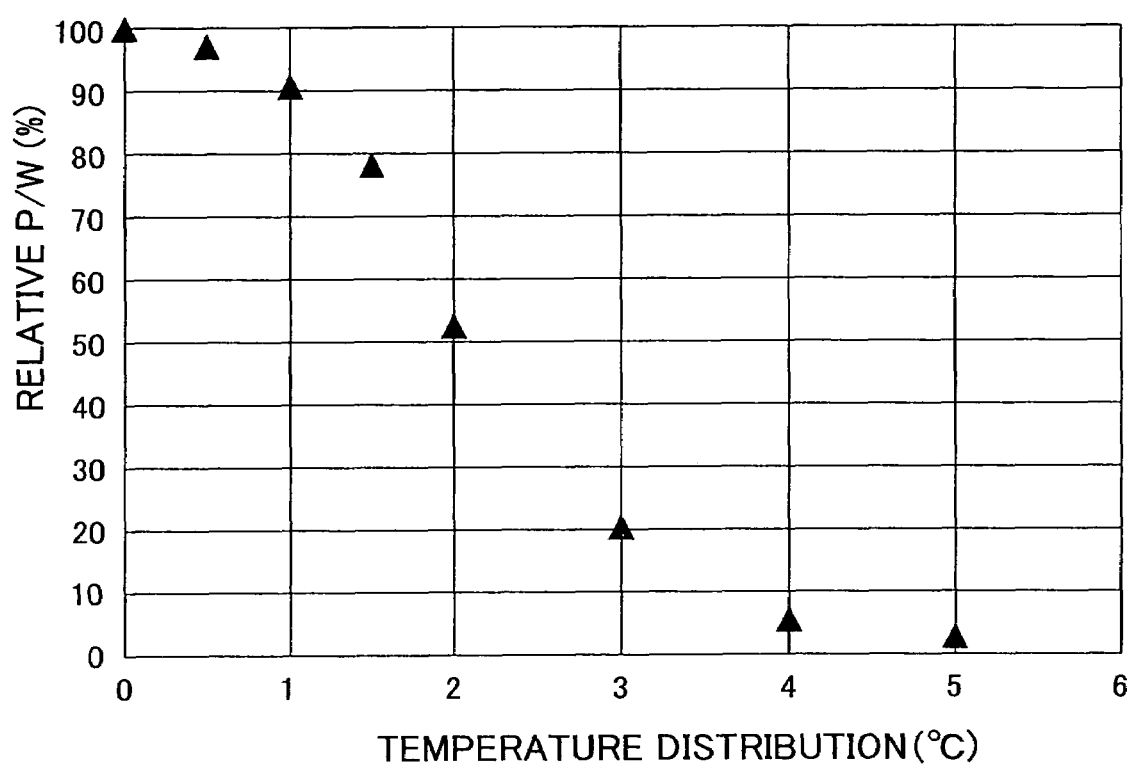
FIG. 16 is a graph illustrating changes in a relative P/W value that occur along with variation of the maximum temperature difference of the base member in the second embodiment.

Next, let us consider the impact that the temperature distribution state of the base member 104 has on the encoding/decoding operation when the wavelength tuning unit 200 is used as a phase encoder (hereinafter referred to as "phase encoder 200") and the wavelength tuning unit 200 is used as a phase decoder (hereinafter referred to as "phase decoder 200) in which the input-output terminal of the wavelength tuning unit 200 are inverted. FIG. 16 shows a chart derived by calculation of the change in the ratio of an autocorrelation peak and a sub-peak (hereinafter, "P/W") of an autocorrelation waveform in the case that a temperature distribution is not set for the base member 104 of the phase encoder 200, and the base member 104 of the phase decoder 200 is given a temperature distribution (the light source wavelength, and the phase encoder 200 and the phase decoder 200 reflected wavelength are the same).

As the temperature distribution of the base member 104 is increased, P/W becomes smaller. When the temperature distribution is between 3° C. to 4° C., P/W becomes less than 1. P/W, as mentioned previously, is the ratio of the autocorrelation peak and sub-peak. Accordingly, from the point of view of performing the encoding/decoding operation reliably, it is favorably if P/W is larger. As can be understood from FIGS. 15 and 16, with the wavelength tuning unit 200 of the present embodiment (the phase encoder 200 and the phase decoder 200), even if there is a difference between the set temperature and the ambient temperature, the base member 104 does not have an uneven temperature distribution. In other words, the temperature of the SSFBG 106 is even, and there is no impact on encoding characteristics (decoding characteristics).

In this manner, with the wavelength tuning unit 200 of the present embodiment, even if, for example, the ambient temperature becomes lower than the set temperature of the temperature controller 130, the temperature of the SSFBG 106 is maintained evenly. Accordingly, the predetermined wavelength can be automatically and stably maintained without having an impact on encoding characteristics.

As described above, according to the present embodiment, an OCDM phase encoder/decoder is provided that can selectively tune a wavelength in a wavelength tuning range of 250 pm or more with a wavelength tuning resolution of 1 pm or less, without having an impact on the encoding characteristics/decoding characteristics (P/W) thereof. This phase coding OCDM encoder/decoder is inexpensive and has a simple structure.

In addition, according to the wavelength tuning method of the present embodiment, the reflected wavelengths of the phase encoder and phase decoder can be stably maintained at a predetermined wavelength by automatically performing re-tuning for minute wavelength variations caused by fluctuations in the ambient temperature, even if differences in set-ambient temperature are not considered.

Note that, it is favorable that the wavelength tuning characteristic data and the wavelength variation characteristic data used in the above embodiments are obtained from actual measurement data. However, it is sufficient if data obtained by simulation is used. In addition, if wavelength characteristic data for each wavelength tuning unit (or wavelength tuning device) is obtained, the temperature can be controlled more accurately.

Hereinabove, preferred embodiments of the present invention have been described with reference to the appended drawings. However, the present invention is not limited to these embodiments. As will be obvious to a person skilled in the art, the invention permits of various modifications and changes without departing from the scope of the claims. Such modifications and changes are understood to come within the scope of the present invention.

In the above embodiments, the structure and operation of the invention when applied in the example of a phase encoder/phase decoder of an OCDM system are explained. However, the wavelength tuning technique of the present invention is not limited to this example, and may be applied, for example, to an encoder/decoder in wavelength-hopping OCDM, a filter device in a WDM system, or the like.

The present invention may be applied as a wavelength tuning device and a wavelength tuning method for tuning the reflected wavelength of a fiber Bragg grating, and in particular may be applied as a wavelength tuning device and a wavelength tuning method for automatically controlling variation of the reflected wavelength caused by temperature fluctuation.

What is claimed is:

1. A wavelength tuning device for tuning a reflected wavelength of a fiber Bragg grating, comprising:
    an optical fiber in which the fiber Bragg grating is formed;
    a base member on which the optical fiber is fixed;
    a first temperature sensor that detects a temperature of the base member;
    a thermo-module that adjusts the temperature of the base member such that the temperature detected by the first temperature sensor is maintained at a desired temperature;
    a second temperature sensor that detects an external temperature of the wavelength tuning device; and
    a temperature controller that controls the thermo-module such that the temperature of the base member is maintained at the desired temperature based on a difference between the desired temperature and the external temperature detected by the second temperature sensor.

2. The wavelength tuning device according to claim 1, wherein
    the second temperature sensor is provided on a casing of the wavelength tuning device.

3. The wavelength tuning device according to claim 1, wherein
    the temperature controller includes a wavelength characteristic data storage portion that stores wavelength characteristic data indicating a characteristic of the reflected wavelength of the fiber Bragg grating that is dependent upon temperature fluctuation, and
    sets a set temperature that causes the reflected wavelength of the fiber Bragg grating to become a desired reflected wavelength based on the wavelength characteristic data, and
    adjusts the set temperature in accordance with fluctuation in the external temperature detected by the second temperature sensor.

4. The wavelength tuning device according to claim 3, wherein
    the wavelength characteristic data includes wavelength tuning characteristic data and wavelength variation characteristic data,
    the wavelength tuning characteristic data indicating the relationship between the set temperature set by the temperature controller and the reflected wavelength of the fiber Bragg grating at predetermined external temperatures, and the wavelength variation characteristic data indicating the relationship between the difference of the set temperature and the external temperature, and variation of the reflected wavelength of the fiber Bragg grating.

5. The wavelength tuning device according to claim 4, wherein
    the wavelength tuning characteristic data and the wavelength variation characteristic data are data obtained by simulation.

6. The wavelength tuning device according to claim 4, wherein
    the temperature controller sets the set temperature that causes the reflected wavelength of the fiber Bragg grating to become the desired reflected wavelength based on the wavelength tuning characteristic data, and calculates a variation rate of the reflected wavelength using the temperature difference between the set temperature and the external temperature based on the wavelength variation characteristic data.

7. The wavelength tuning device according to claim 1, wherein the base member is made of material with low thermal expansivity.

8. The wavelength tuning device according to claim 1, further comprising:
    a support member that supports the base member, the support member being one of or both of a casing of the wavelength tuning device, and a holder that supports the base member within the casing.

9. The wavelength tuning device according to claim 8, wherein
    an expansion-contraction absorbent is interposed between the support member and the base member, the expansion-contraction absorbent absorbing expansion/contraction of the support member that occurs along with temperature fluctuation.

10. The wavelength tuning device according to claim 8, wherein the holder is made of material with high thermal conductivity.

11. The wavelength tuning device according to claim 8, wherein the base member and the holder are engaged at one location.

12. The wavelength tuning device according to claim 11, wherein the one location is a central area of the holder in a longitudinal direction of the optical fiber.

13. The wavelength tuning device according to claim 8, further comprising:
    a thermal conduction inhibiting member that is made of material with low thermal conductivity, and wherein
    the base member is surrounded by the holder and the thermal conduction inhibiting member.

14. A wavelength tuning method for a wavelength tuning unit including an optical fiber in which a fiber Bragg grating is formed, a base member to which the optical fiber is fixed, a first temperature sensor that detects a temperature of the base member, and a thermo-module that adjust the temperature of the base member such that the temperature detected by the first temperature sensor is maintained at a desired temperature, the wavelength tuning method comprising:
    a first step of setting a temperature of the thermo-module which causes a reflected wavelength of the fiber Bragg grating to become a desired reflected wavelength, the first step being based on wavelength tuning characteristic data that indicates the relationship of the reflected wavelength of the fiber Bragg grating, and the set temperature of the thermo-module;
    a second step of calculating a temperature difference of the set temperature set in the first step, and an external temperature of the wavelength tuning unit; and
    a third step of adjusting the set temperature set in the first step using the temperature difference calculated in the second step based on wavelength variation characteristic data indicating the relationship between the temperature difference of the set temperature of the thermo-module and the external temperature of the wavelength tuning unit, and variation of the reflected wavelength of the fiber Bragg grating.

15. The wavelength tuning method according to claim 14, further comprising:
    a fourth step of calculating, in the case that the external temperature of the wavelength tuning unit fluctuates, the temperature difference of the set temperature adjusted in the third step and the external temperature of the wavelength tuning unit; and a fifth step of adjusting the set temperature adjusted in the third step using the temperature difference calculated in the fourth step based on the wavelength variation characteristic data.

16. The wavelength tuning method according to claim 15, wherein
the set temperature of the thermo-module is adjusted by repeatedly performing the fourth step and the fifth step.

17. The wavelength tuning method according to claim 14, wherein
the wavelength tuning characteristic data and the wavelength variation characteristic data are stored in a temperature controller that controls the thermo-module such that the temperature of the base member is maintained at the desired temperature.

18. A wavelength tuning device for tuning a reflected wavelength of a fiber Bragg grating, comprising:
an optical fiber in which the fiber Bragg grating is formed;
a base member on which the optical fiber is fixed;
a first temperature sensor that detects a temperature of the base member;
a thermo-module that adjusts the temperature of the base member such that the temperature detected by the first temperature sensor is maintained at a desired temperature;
a second temperature sensor that detects an external temperature of the wavelength tuning device; and
a temperature controller that controls the thermo-module such that the temperature of the base member is maintained at the desired temperature based on the external temperature detected by the second temperature sensor, wherein
the temperature controller includes a wavelength characteristic data storage portion that stores wavelength characteristic data indicating a characteristic of the reflected wavelength of the fiber Bragg grating that is dependent upon temperature fluctuation, and
sets a set temperature that causes the reflected wavelength of the fiber Bragg grating to become a desired reflected wavelength based on the wavelength characteristic data, and
adjusts the set temperature in accordance with fluctuation in the external temperature detected by the second temperature sensor.

19. A wavelength tuning device for tuning a reflected wavelength of a fiber Bragg grating, comprising:
an optical fiber in which the fiber Bragg grating is formed;
a base member on which the optical fiber is fixed;
a support member that supports the base member, the support member being one of or both of a casing of the wavelength tuning device, and a holder that supports the base member within the casing;
a first temperature sensor that detects a temperature of the base member;
a thermo-module that adjusts the temperature of the base member such that the temperature detected by the first temperature sensor is maintained at a desired temperature;
a second temperature sensor that detects an external temperature of the wavelength tuning device; and
a temperature controller that controls the thermo-module such that the temperature of the base member is maintained at the desired temperature based on the external temperature detected by the second temperature sensor; wherein:
an expansion-contraction absorbent is interposed between the support member and the base member, the expansion-contraction absorbent absorbing expansion/contraction of the support member that occurs along with temperature fluctuation.

20. A wavelength tuning device for tuning a reflected wavelength of a fiber Bragg grating, comprising:
an optical fiber in which the fiber Bragg grating is formed;
a base member on which the optical fiber is fixed;
a support member that supports the base member, the support member being one of or both of a casing of the wavelength tuning device, and a holder that supports the base member within the casing;
a thermal conduction inhibiting member that is made of material with low thermal conductivity, wherein the base member is surrounded by the holder and the thermal conduction inhibiting member;
a first temperature sensor that detects a temperature of the base member;
a thermo-module that adjusts the temperature of the base member such that the temperature detected by the first temperature sensor is maintained at a desired temperature;
a second temperature sensor that detects an external temperature of the wavelength tuning device; and
a temperature controller that controls the thermo-module such that the temperature of the base member is maintained at the desired temperature based on the external temperature detected by the second temperature sensor.

* * * * *